(12) United States Patent
Kay et al.

(10) Patent No.: US 8,502,077 B2
(45) Date of Patent: Aug. 6, 2013

(54) ELECTRICAL CONDUCTIVE ELEMENT

(75) Inventors: David Brian Kay, Tenambit (AU); Rodney Wayne Appleby, Springfield (AU); Richard John Goodridge, Redhead (AU); Dong Yang Wu, Wheelers Hill (AU); Stuart Arthur Bateman, Mount Waverley (AU); Carmelo Dell'Olio, Kalorama (AU)

(73) Assignee: Orica Explosives Technology Pty Ltd, Melbourne (AU)

( * ) Notice: Subject to any disclaimer, the term of this patent is extended or adjusted under 35 U.S.C. 154(b) by 21 days.

(21) Appl. No.: 12/307,918

(22) PCT Filed: Jul. 12, 2007

(86) PCT No.: PCT/AU2007/000972
§ 371 (c)(1),
(2), (4) Date: Dec. 29, 2009

(87) PCT Pub. No.: WO2008/006166
PCT Pub. Date: Jan. 17, 2008

(65) Prior Publication Data
US 2010/0162912 A1    Jul. 1, 2010

(51) Int. Cl.
| | |
|---|---|
| H01B 1/00 | (2006.01) |
| H01B 1/02 | (2006.01) |
| H01B 1/04 | (2006.01) |
| H01B 1/06 | (2006.01) |
| H01B 1/12 | (2006.01) |
| H01B 1/22 | (2006.01) |
| H01B 1/24 | (2006.01) |
| H01B 7/18 | (2006.01) |
| H01B 9/02 | (2006.01) |
| H01B 7/20 | (2006.01) |
| H01C 3/06 | (2006.01) |
| H01C 7/00 | (2006.01) |
| F42B 3/10 | (2006.01) |
| F42B 3/12 | (2006.01) |
| F42C 11/00 | (2006.01) |
| F42C 19/12 | (2006.01) |
| D02G 3/00 | (2006.01) |

(52) U.S. Cl.
USPC ............ 174/102 C; 174/102 R; 252/500; 252/502; 252/506; 252/512; 102/202.5; 338/214; 428/373

(58) Field of Classification Search
USPC ............ 252/500, 502, 506, 512; 174/102 R, 174/102 C; 102/202.5; 338/214; 428/373
See application file for complete search history.

(56) References Cited

U.S. PATENT DOCUMENTS

| | | | | |
|---|---|---|---|---|
| 3,708,335 | A | * | 1/1973 | Fujiwara et al. ............ 442/202 |
| 4,085,182 | A | * | 4/1978 | Kato ............................ 264/105 |
| 5,827,997 | A | * | 10/1998 | Chung et al. ................. 174/388 |
| 6,252,172 | B1 | * | 6/2001 | Tanigawa et al. ....... 174/102 SC |
| 6,362,418 | B1 | * | 3/2002 | Grandy et al. ................. 174/36 |
| 2002/0160193 | A1 | * | 10/2002 | Hajmrle et al. ............... 428/403 |
| 2004/0062974 | A1 | | 4/2004 | Abd Elhamid et al. |

FOREIGN PATENT DOCUMENTS

| | | |
|---|---|---|
| DE | 10330832 | 2/2004 |
| EP | 0231068 | 8/1987 |
| EP | 0747909 | 12/1996 |
| WO | WO-02/067274 | 8/2002 |

OTHER PUBLICATIONS

Database WPI Week 200270, Thomson Scientific, London, GB, AN 2002-657312, XP002529489, & WO 02/31030 A (Osaka Gas Co Ltd), Apr. 18, 2002, Abstract.

* cited by examiner

Primary Examiner — Harold Pyon
Assistant Examiner — Tanisha Diggs
(74) Attorney, Agent, or Firm — Birch, Stewart, Kolasch & Birch, LLP

(57) ABSTRACT

A conductive element suitable for the transmission of an electrical operating signal to a detonator, which conductive element comprises a conductive filler homogeneously dispersed in a polymer matrix.

20 Claims, 25 Drawing Sheets

Figure 29:
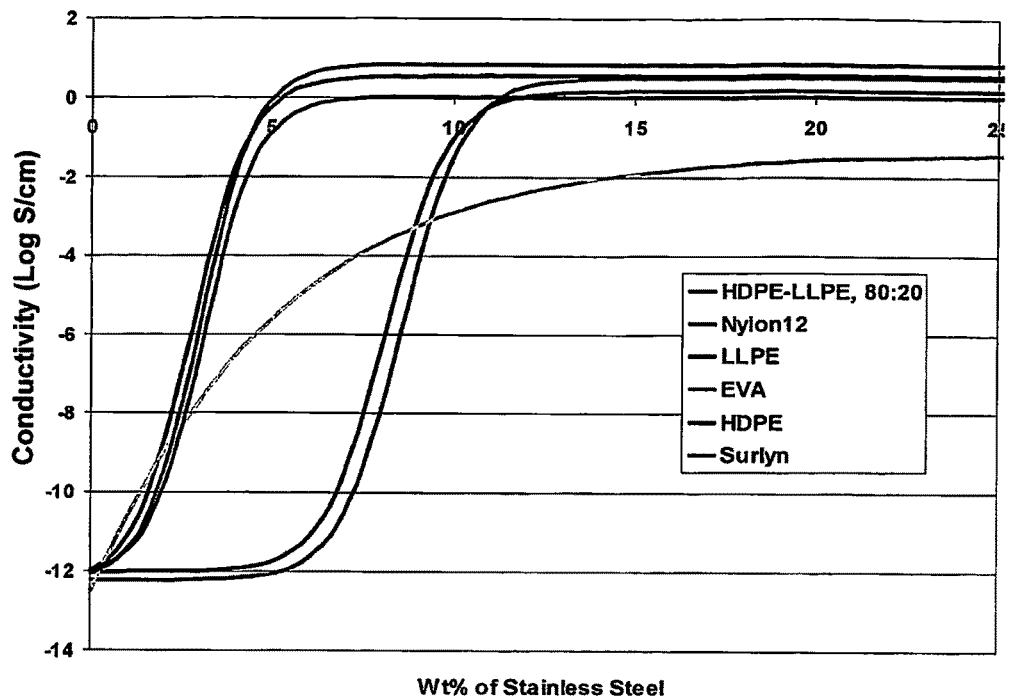

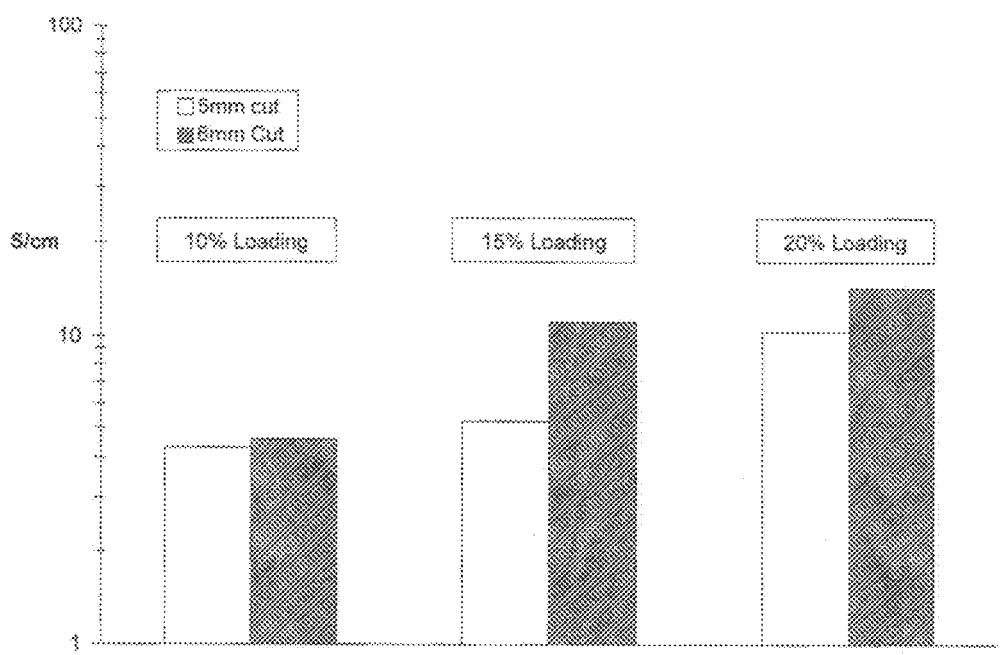
FIGURE 1 Variation in conductivity of HDPE – stainless steel composites with initial stainless steel fibre length and loading

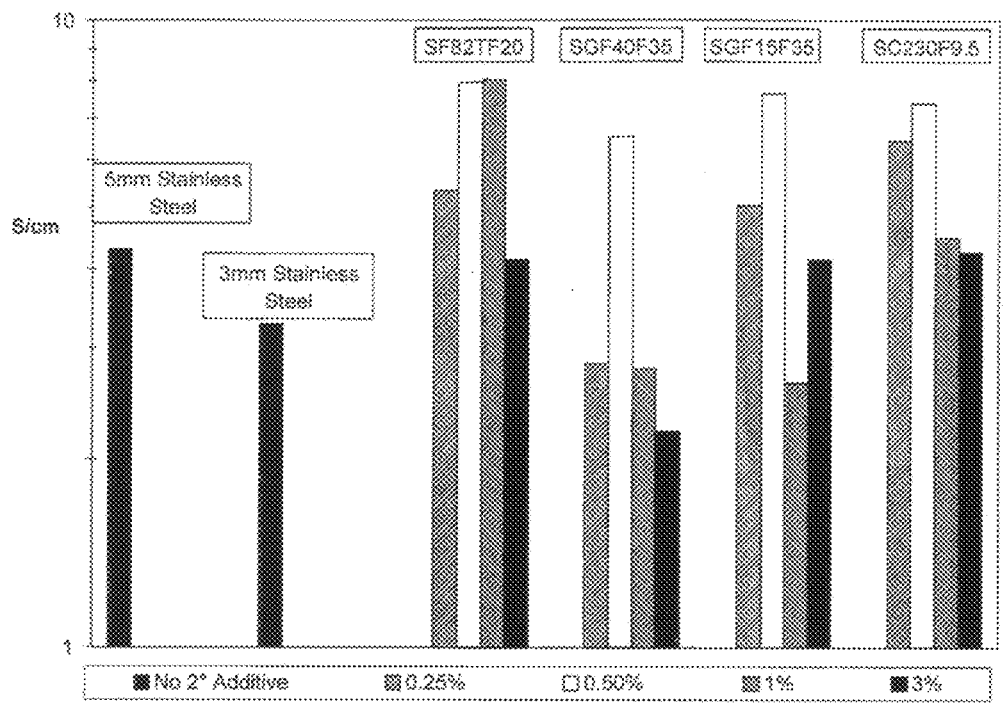
FIGURE 2 Conductivity of HDPE – 10wt% stainless steel composites incorporating selected secondary elements
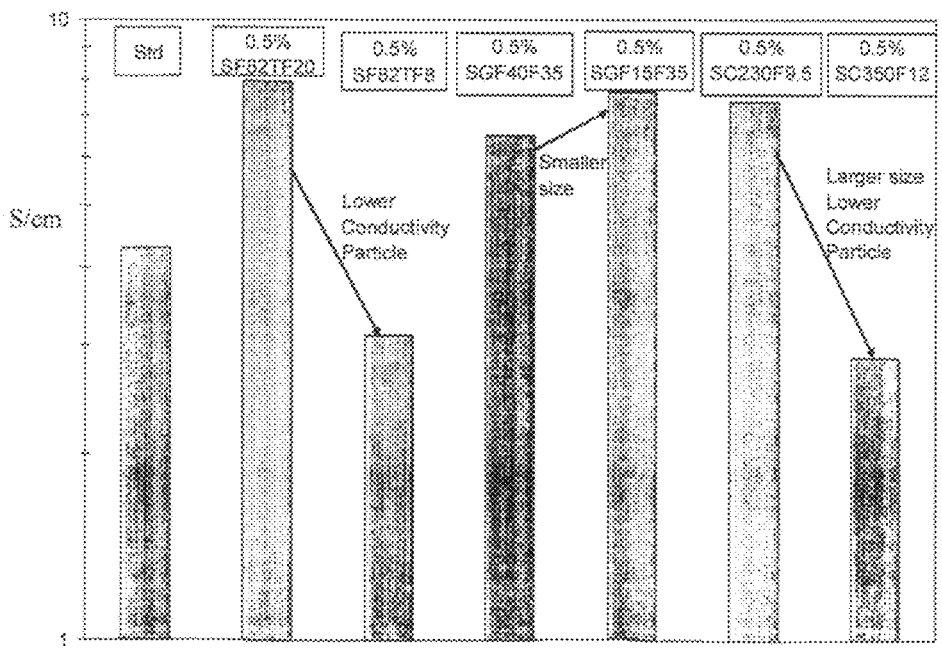
FIGURE 3 Impact of secondary element size and conductivity on the conductivity of Surlyn – 10wt% stainless steel composites.

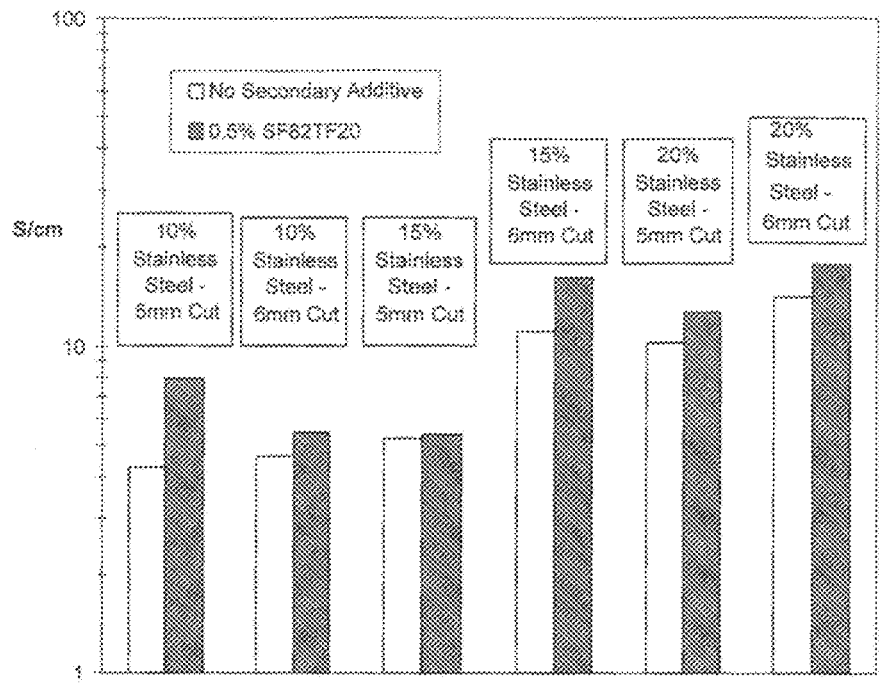
FIGURE 4 Variation in HDPE conductivity with stainless steel loading, cut length, and the presence of silver coated glass micro-fibre secondary elements
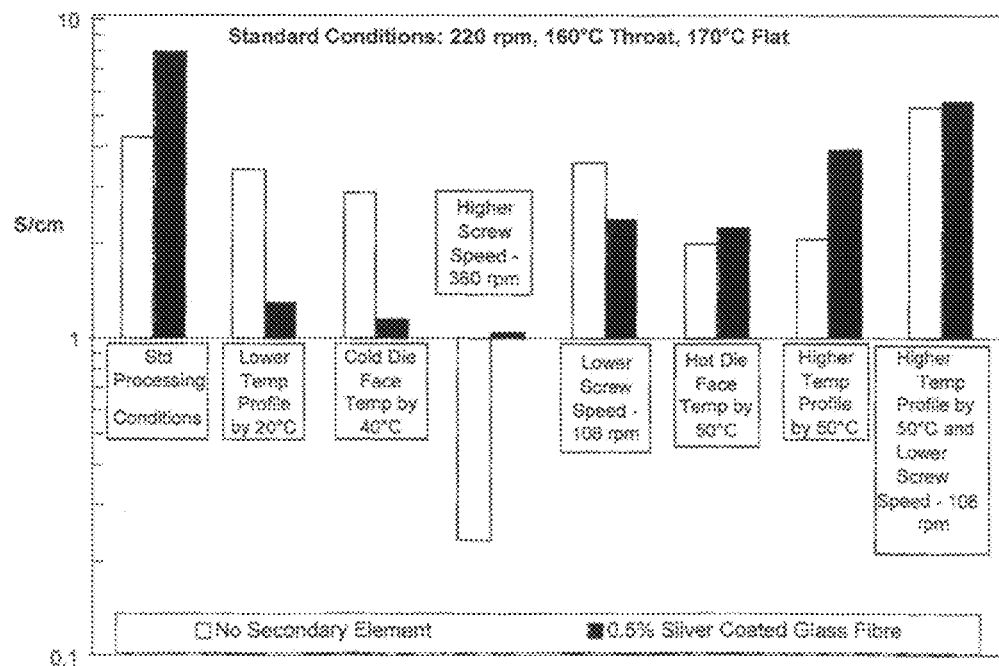
FIGURE 5 Impact of processing variables on the conductivity of HDPE based composite materials incorporating 10wt% stainless steel and 0.5wt% silver coated glass fibre.

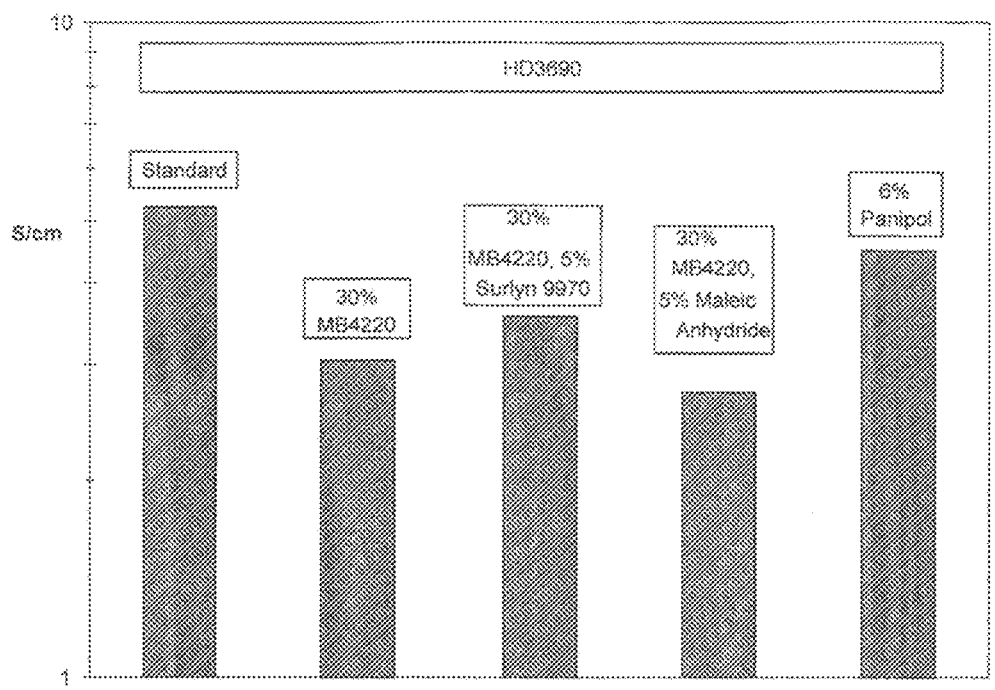
FIGURE 6 Conductive composite prepared from HDPE Blends incorporating carbon nanotubes (MB4220) and polyaniline (panipol)

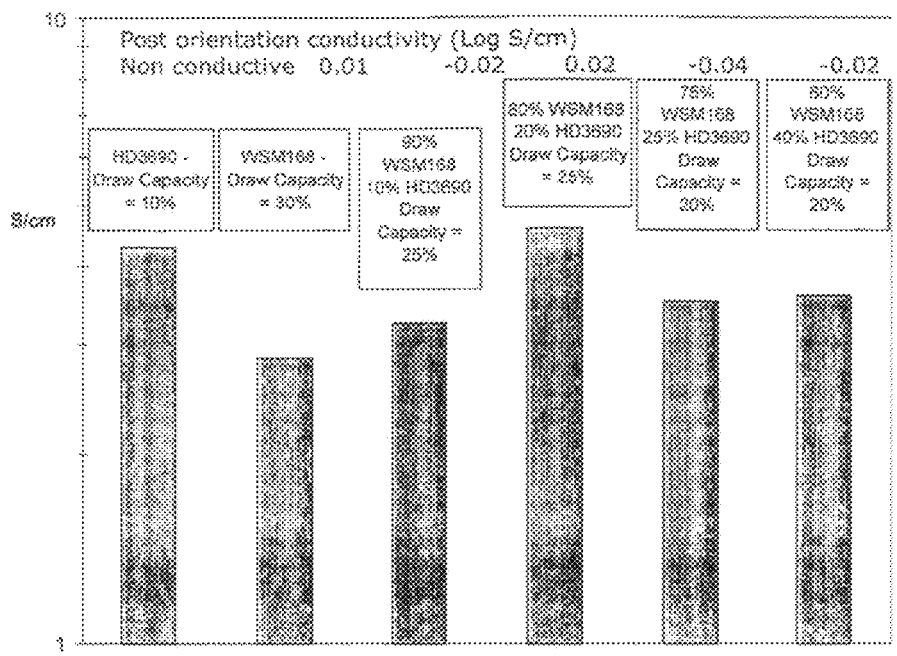
FIGURE 7 Draw capacity and conductivity results from various conductive polyolefin (HDPE 3690 – LDPE WSM-168) composite blends
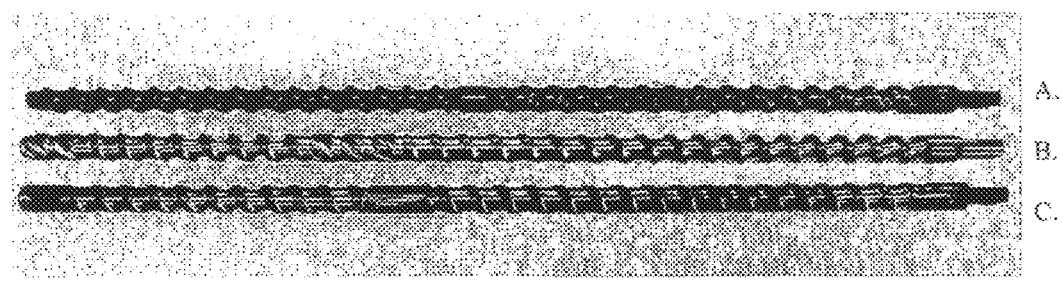
FIGURE 8 Single Screw Extruder Screw Designs
(A: low shear, B: medium shear design, C: high shear screw)

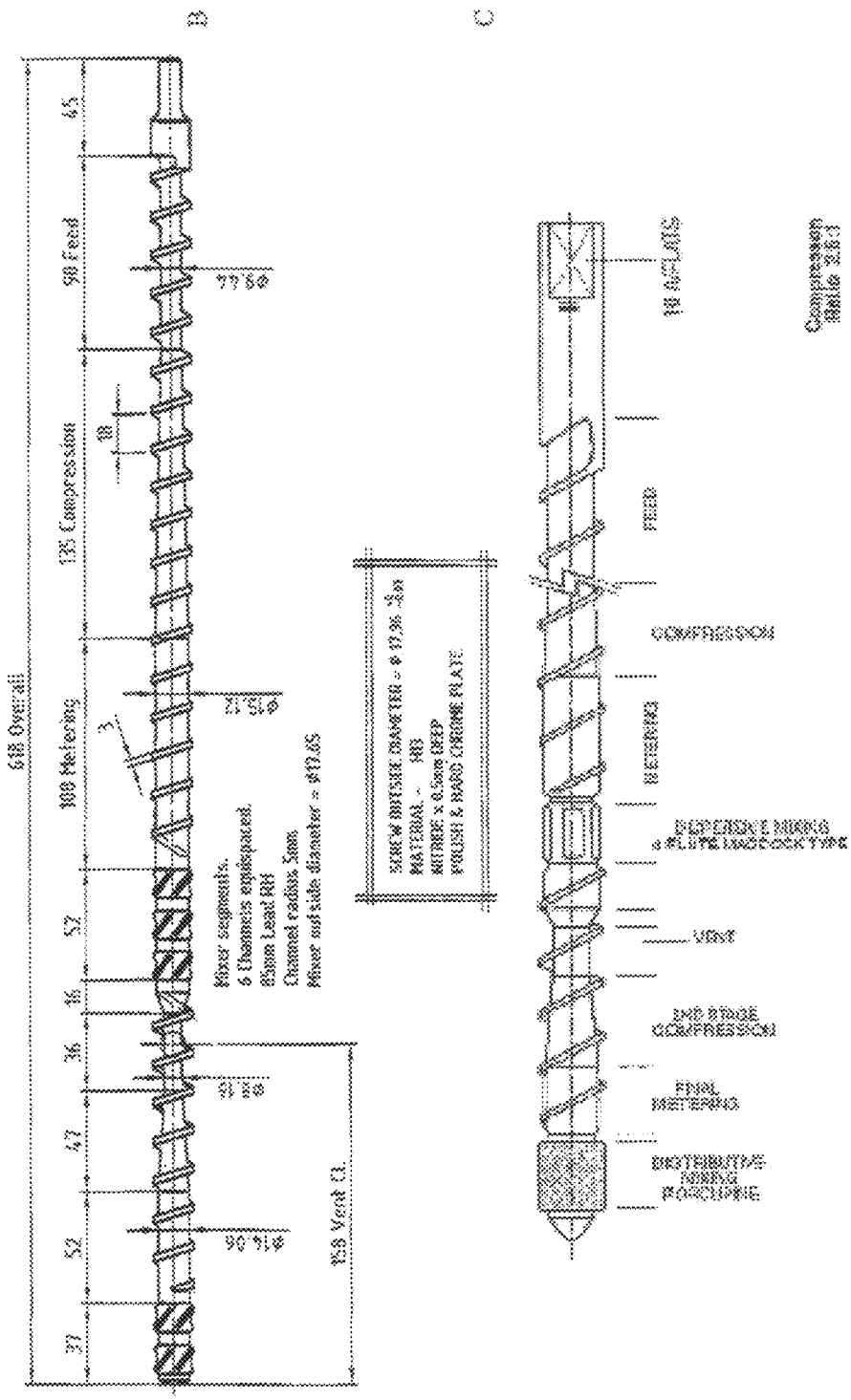
FIGURE 9 Screw Configurations: B, "medium shear" C, "high shear"

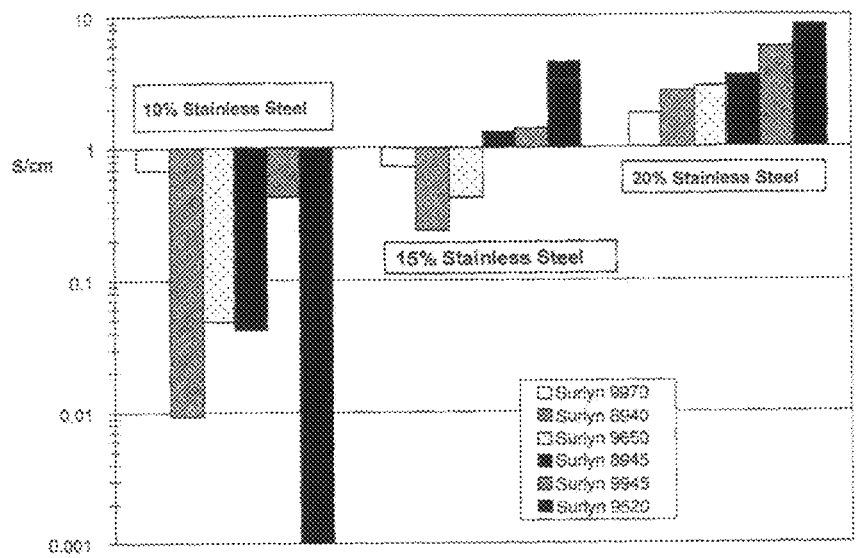
FIGURE 10 Variation in conductivity of stainless steel composites with different Surlyn types and compounded using the high shear screw design.
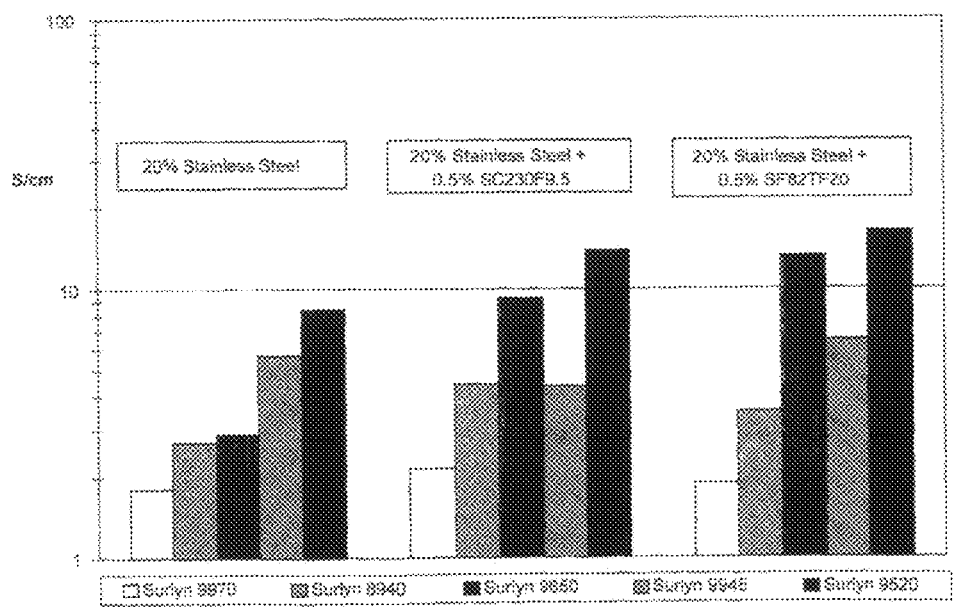
FIGURE 11 Comparison of conductivity values of different Surlyn grades prepared with stainless steel and secondary elements.

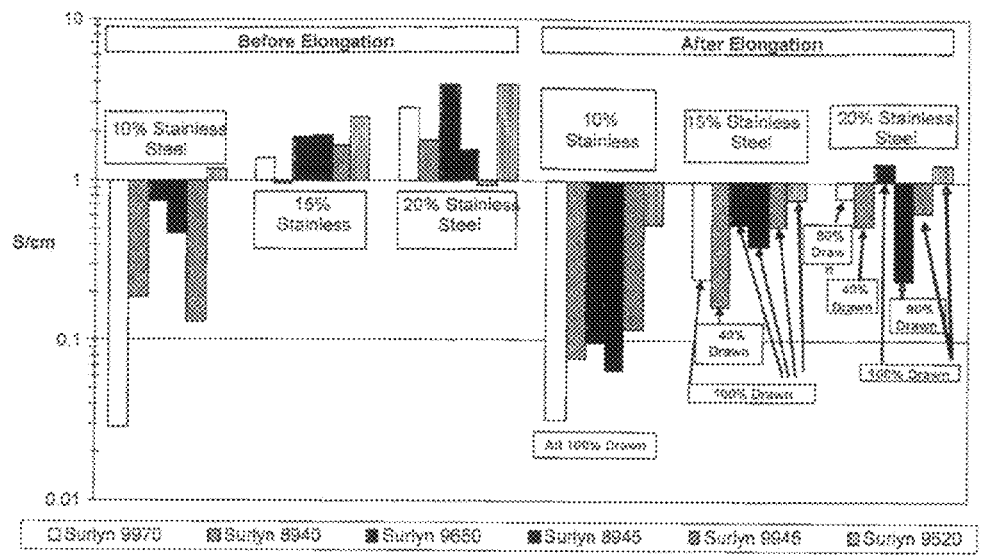
FIGURE 12 Impact of orientation (200mm/min, Instron) on the conductivity of different Surlyn grades and formulations
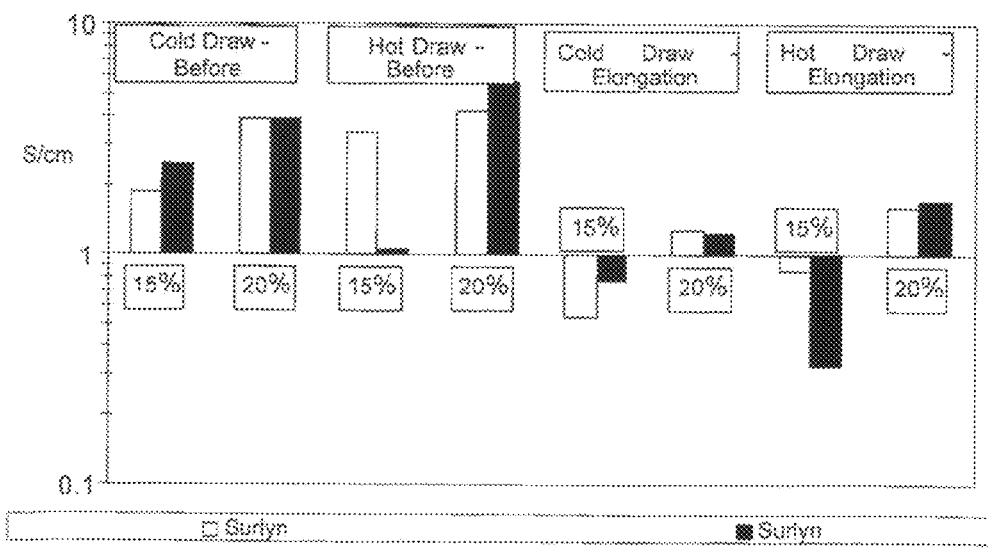
FIGURE 13 Orientation experiments (2:1 ratio, 200mm/min draw ratio) for Surlyn 9650 and 9520 grades with different stainless steel loadings at ambient (25°C) and elevated temperatures (80°C) Surlyn Caption which is 9650 and 9520

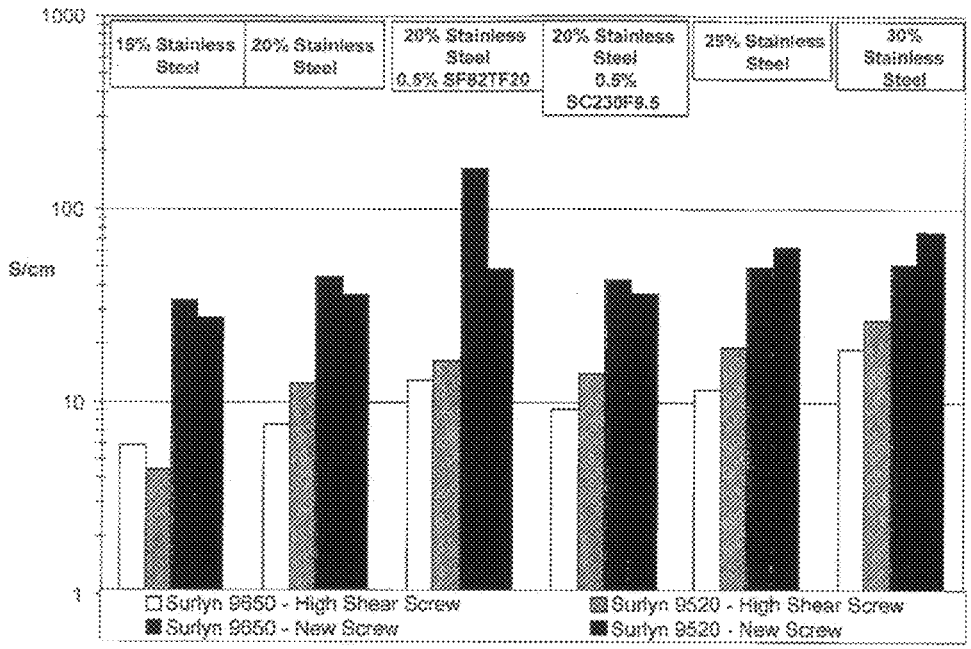
FIGURE 14 Comparison of conductivity for various Surlyn formulations compounded with the high shear and medium shear (new screw) designs
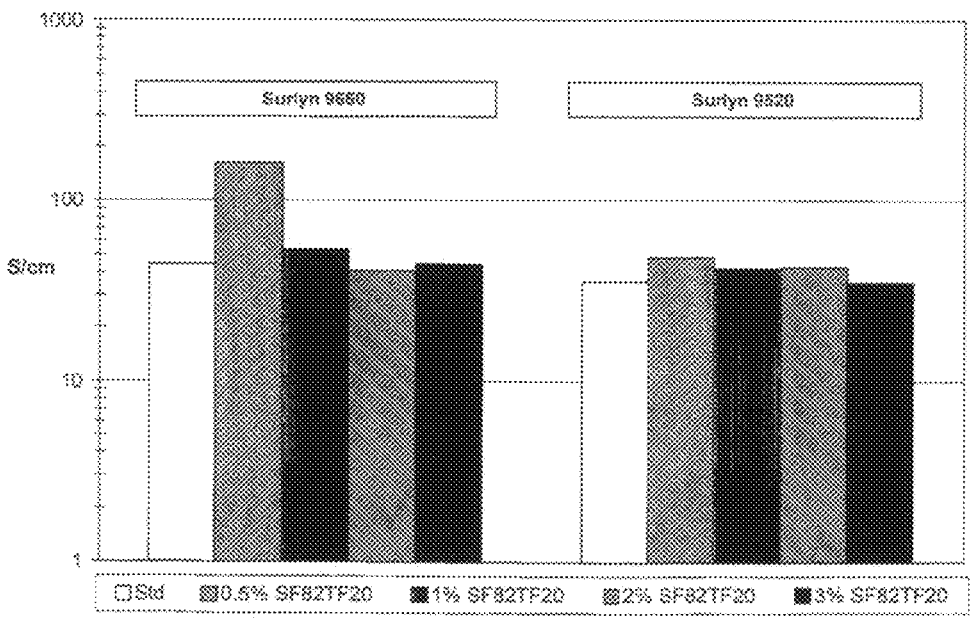
FIGURE 15 Impact of different silver coated glass fibre secondary element loadings on the conductivity of Surlyn – 20wt% stainless steel composite materials.

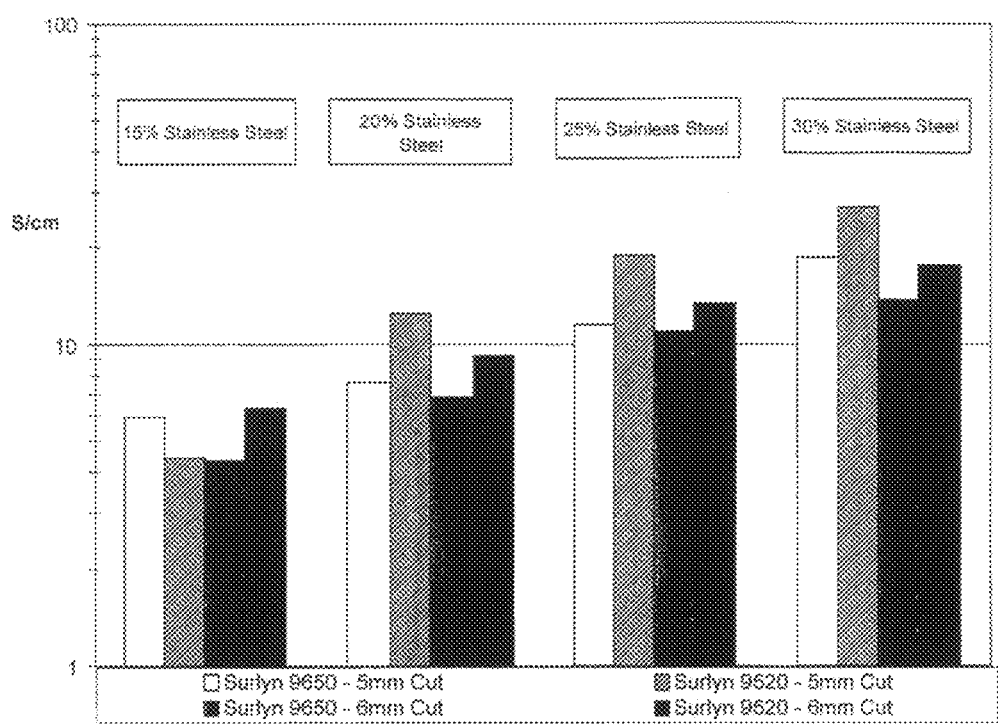
FIGURE 16 Impact of different stainless steel fibre cut length on conductivity of Surlyn composites prepared with different loadings of stainless steel (high shear screw)

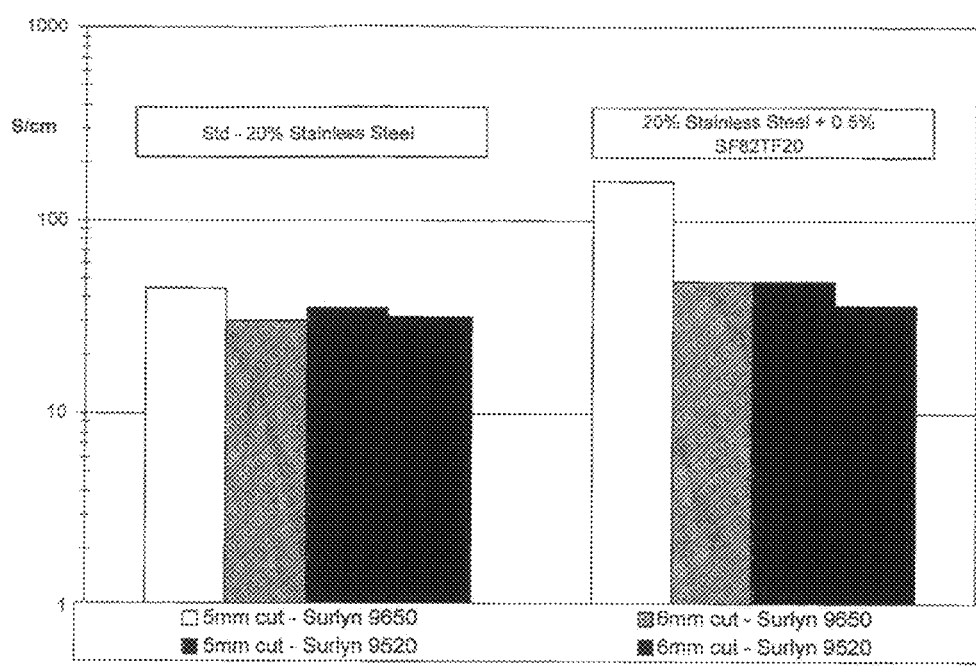
FIGURE 17 Impact of different stainless steel fibre cut length on conductivity of Surlyn composites prepared with different loadings of stainless steel (medium shear screw)

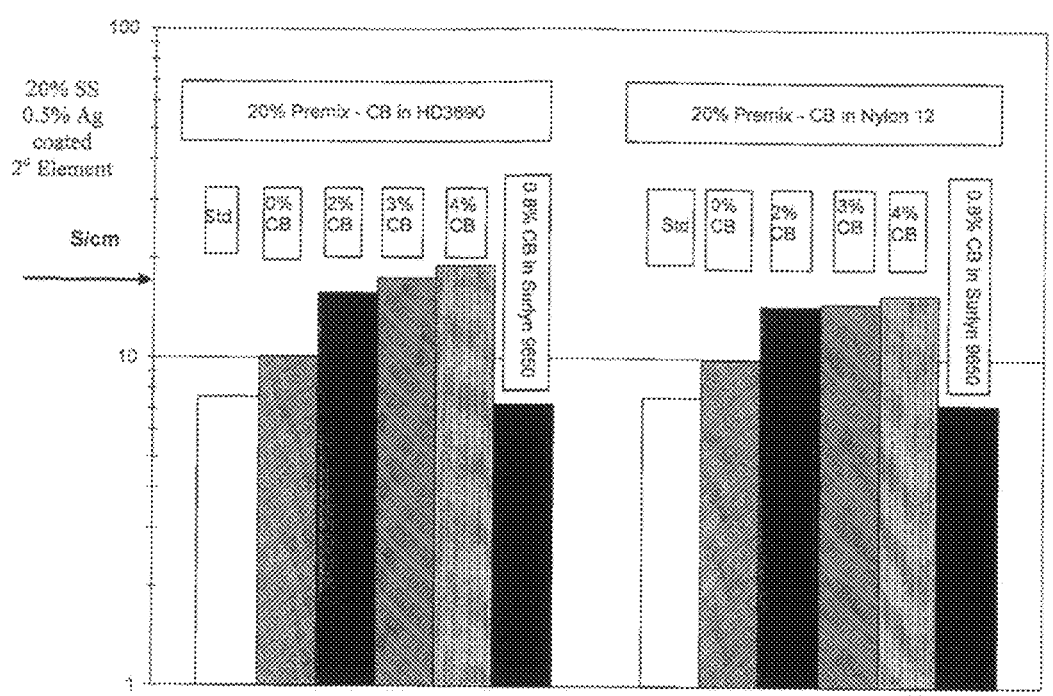
FIGURE 18 Conductivity values of Surlyn 9650 blends incorporating carbon black (up to a 0.8% overall loading) and secondary processing to introduce 20wt% stainless steel microfibres (high shear screw)

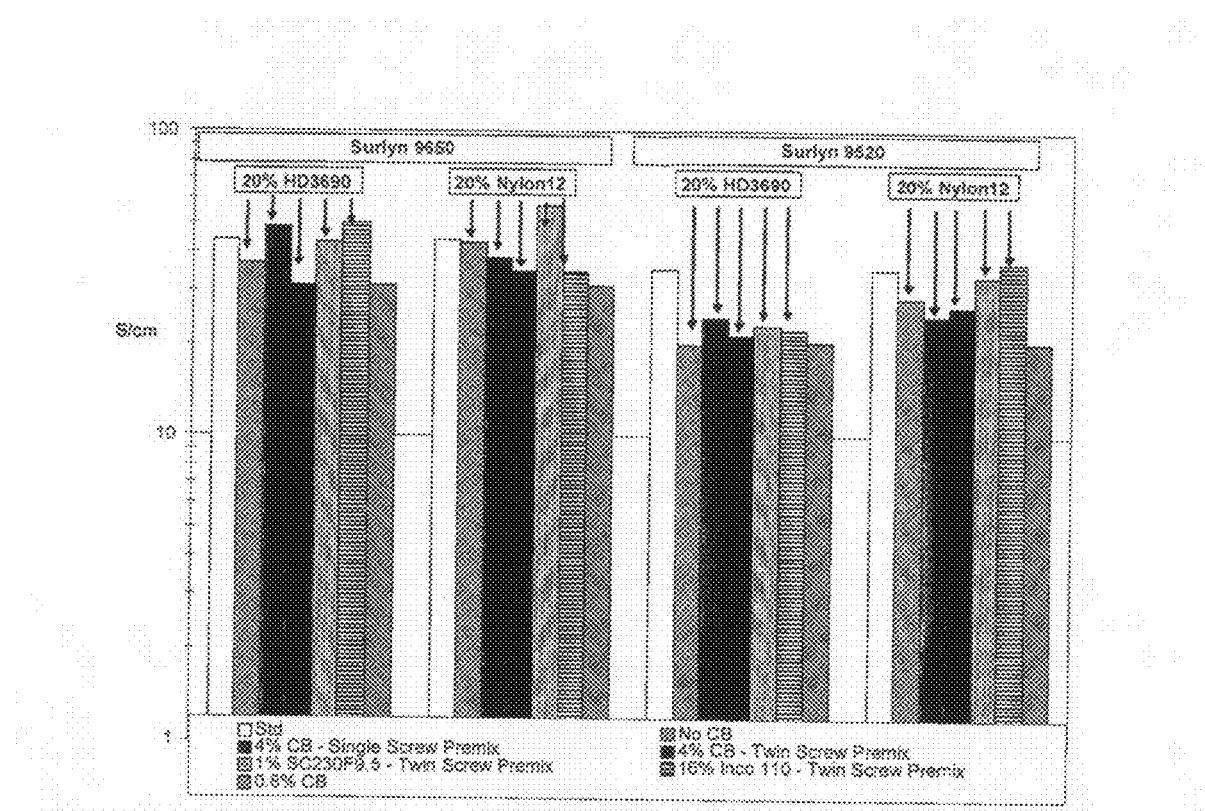
FIGURE 19 Surlyn blends prepared from pre-compounded secondary elements into HDPE or Nylon 12 (9005P), with the stainless steel added at the final stage by single screw extrusion employing the medium shear screw.

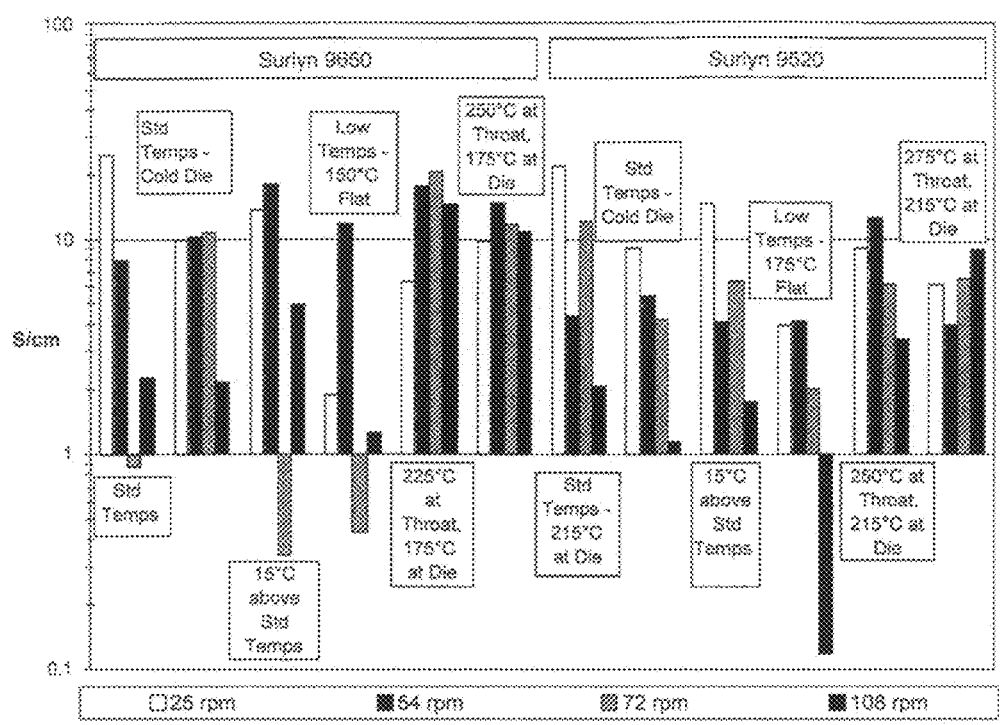
FIGURE 20 Optimization of processing conditions used to prepare conductive Surlyn composites containing 20 wt% stainless steel at a 1.0 mm diameter wire.
20% Stainless Steel in Surlyn 9520 ~ 25 rpm
(conductivity~0.9x10$^3$S/cm)

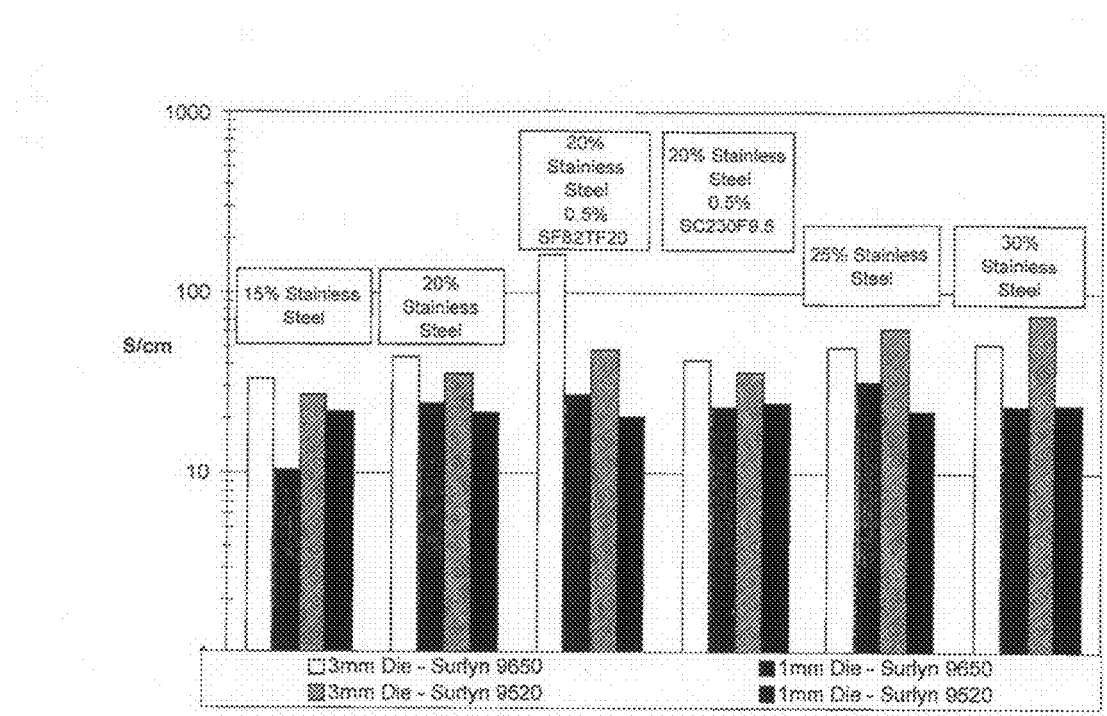
FIGURE 21 Comparison of conductivity values from various conductive formulations compounded through 3mm and 1mm diameter dies employing the medium shear screw design and best processing conditions determined for the formulation.

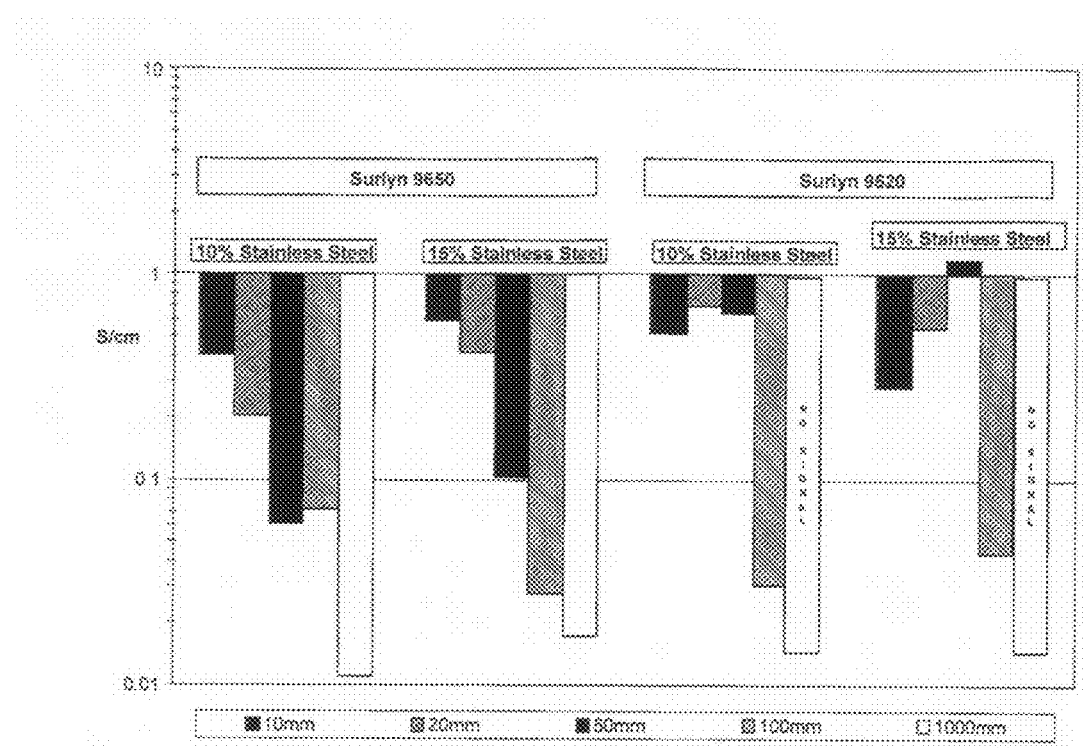
FIGURE 22 Conductivity values for different strand lengths of stainless steel loaded Surlyn composite materials prepared by extrusion through a 0.5mm diameter aperture die.

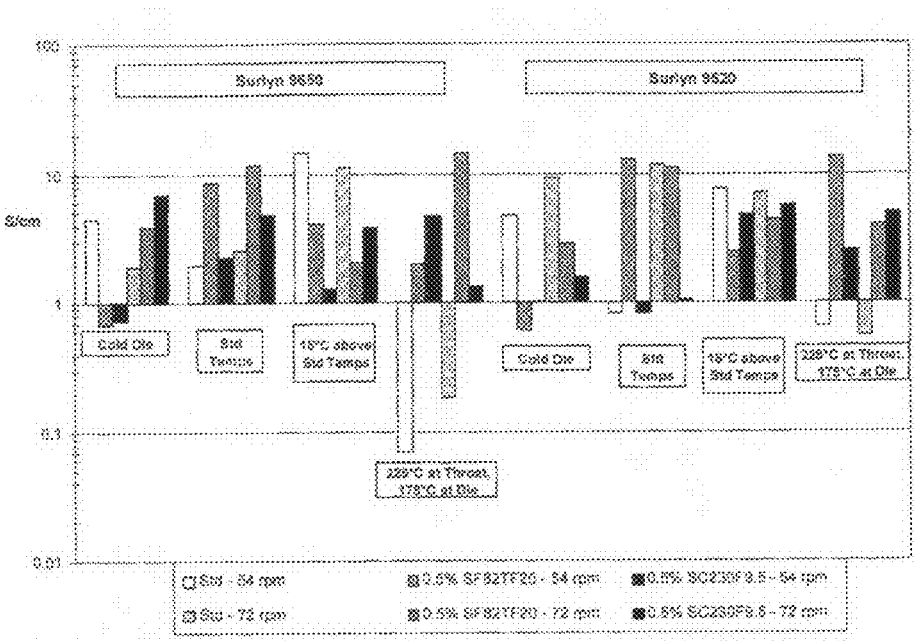
FIGURE 23 Conductivity values obtained from formulations containing 20wt% stainless steel under different processing conditions extruded through a 0.7mm die.
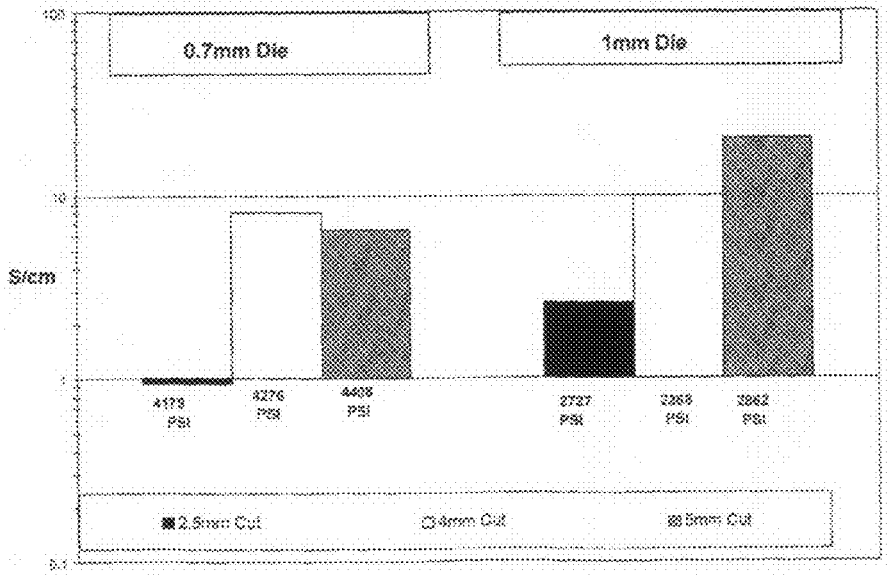
FIGURE 24 Comparative back pressure values from Surlyn composites containing 20wt% stainless steel at different cut lengths

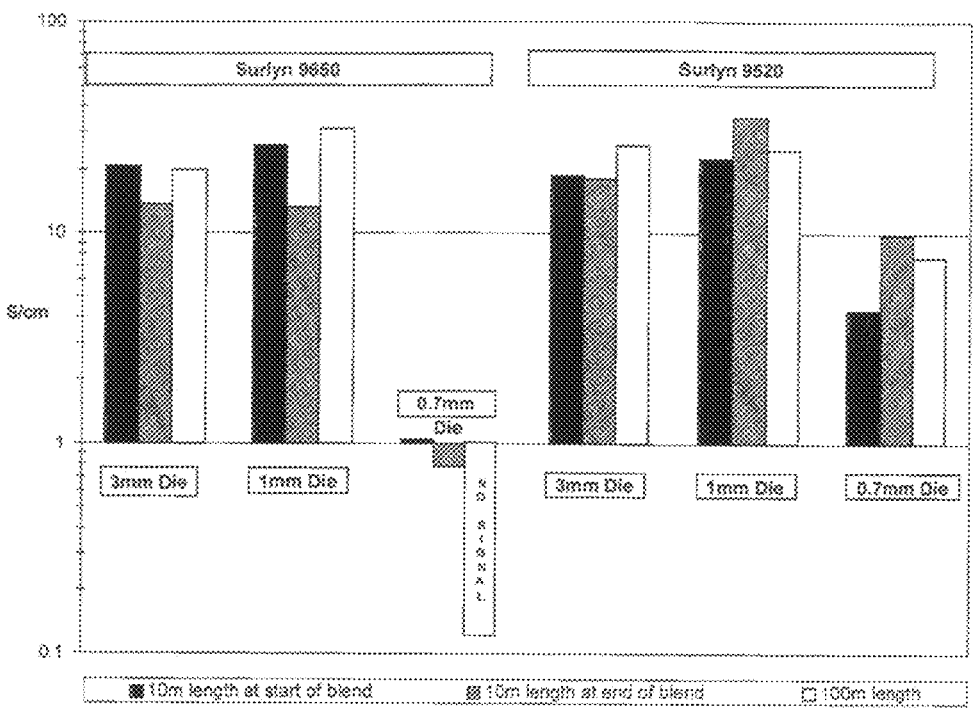
FIGURE 25 Conductivities of different diameter conductive cores over 100M lengths prepared with 20wt% stainless steel
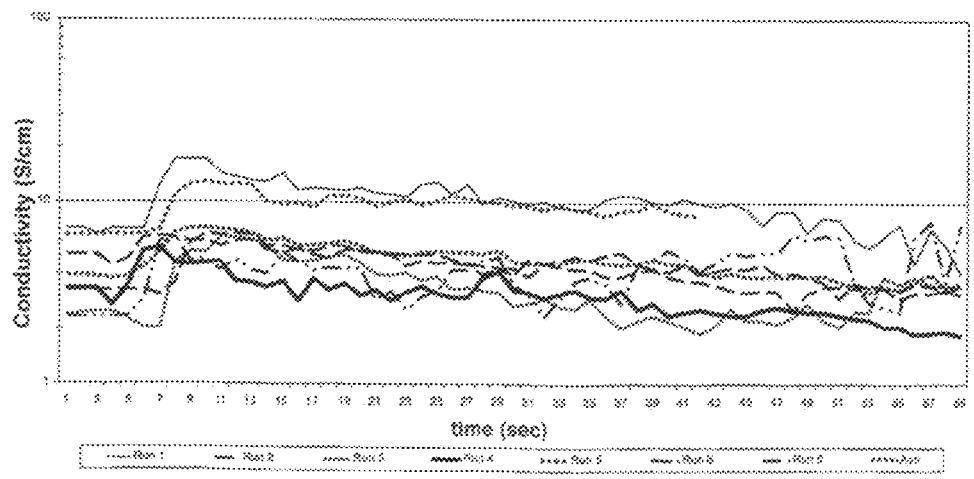
FIGURE 26 Average change in conductivity of conductive composites with increasing elongation extracted form eight separate tests

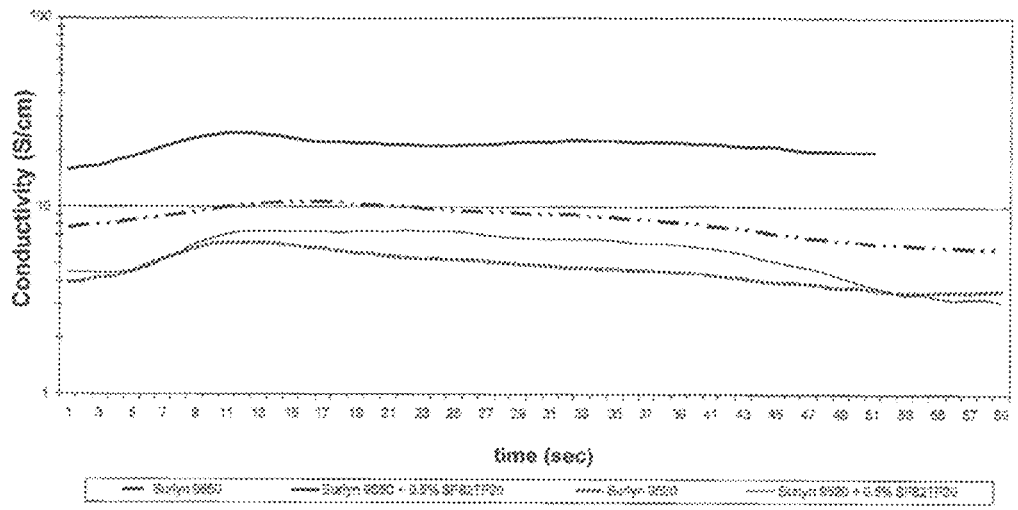
FIGURE 27 Change in conductivity with increasing elongation for various Surlyn conductive composites employing a strain rate of 50mm/min
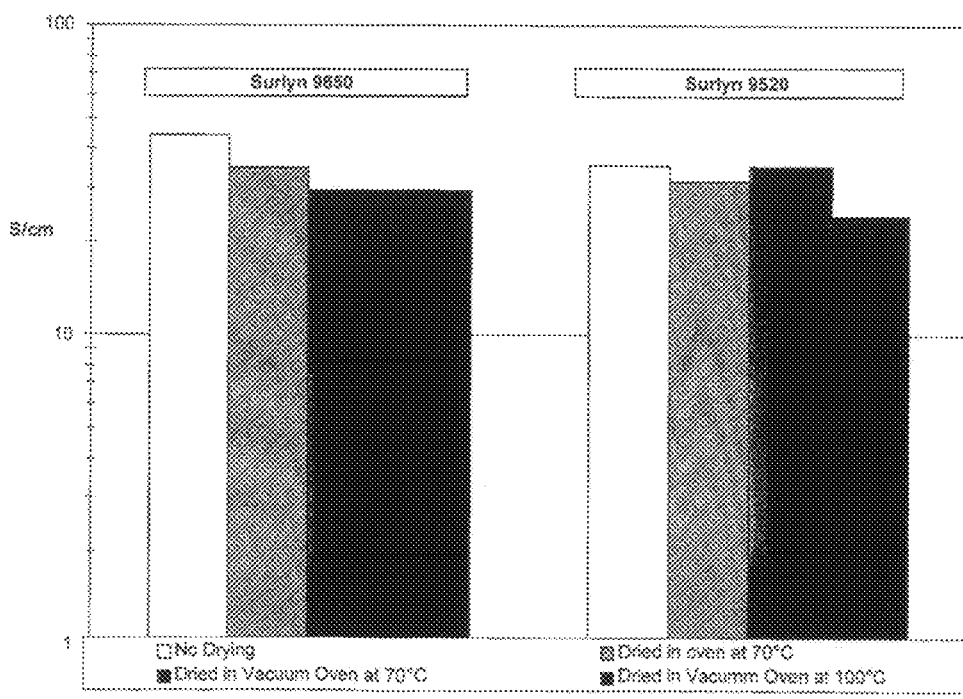
FIGURE 28 Impact pre-drying the stainless steel bundles prior to compounding with Surlyn has on conductivity of the wire produced

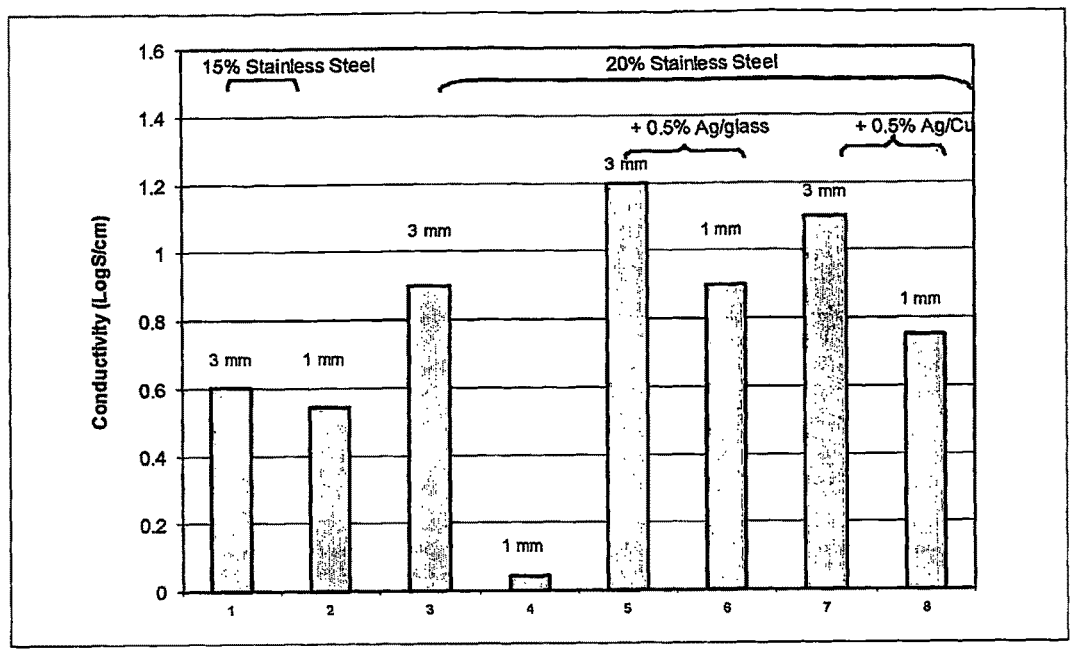
FIGURE 31
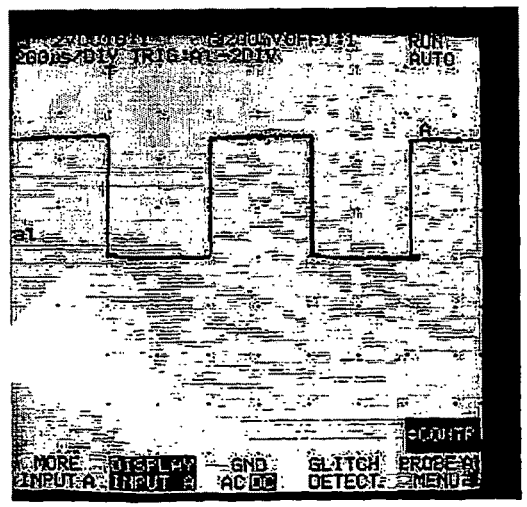
FIGURE 32 Direct Connection (Copper Wire)

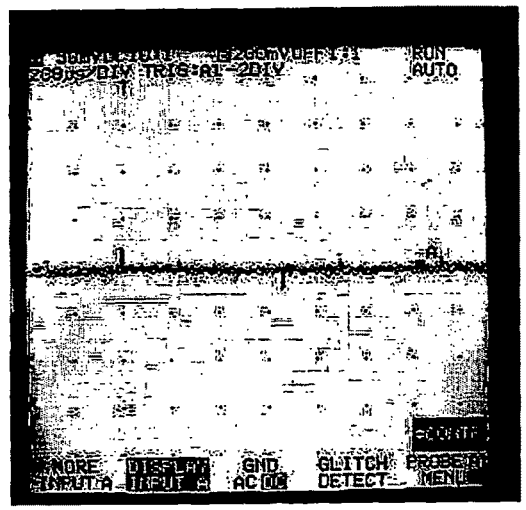
FIGURE 33 Polymer Tube (Insulator)
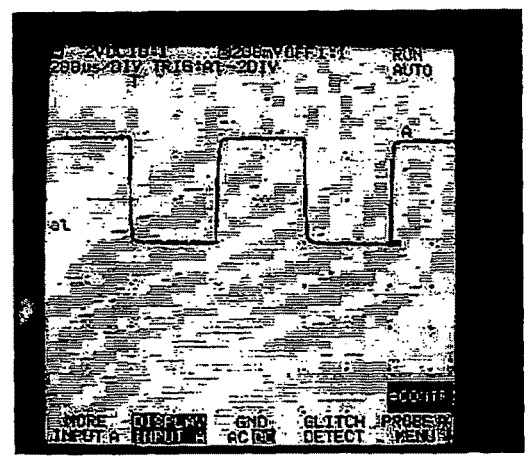
FIGURE 34 10% Stainless Steel Fibre in 80/20 LLDPE/HDPE Blend, 10 metres

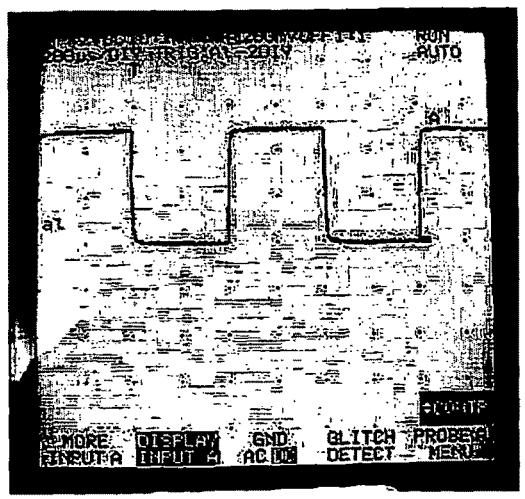
FIGURE 35 10% Stainless Steel Fibre in 100% HDPE, 10 metres
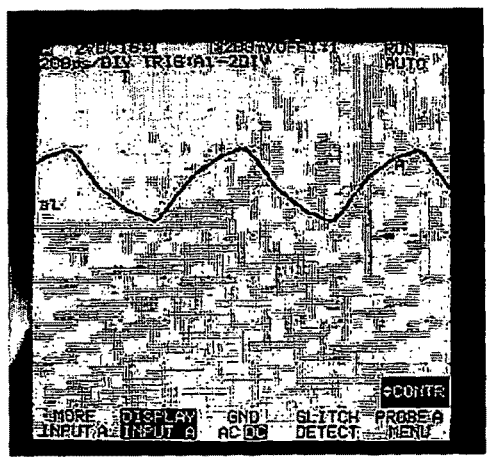
FIGURE 36 15% Stainless Steel Fibre in Surlyn 9650, ~85 metres

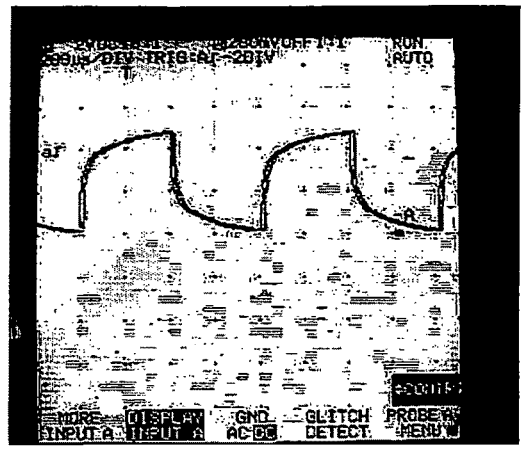
FIGURE 37 Wave form from 1st 1m sample of the 85m sample of 15% Stainless Steel fibre in Surlyn 9650
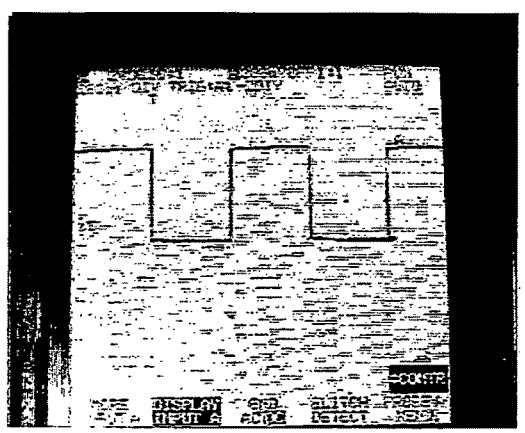
FIGURE 38 Wave form from 1m sample of 15% Stainless Steel fibre in Surlyn 9650
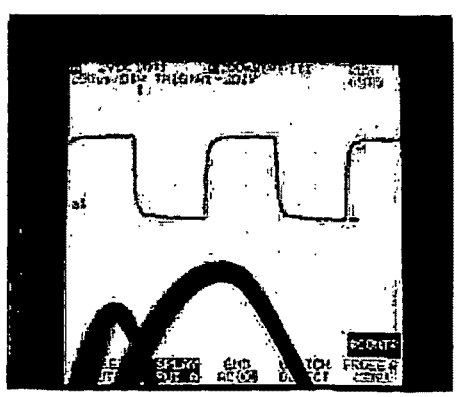
FIGURE 39 Wave form from 1m sample of 15% Stainless Steel fibre in Surlyn 9650 bunched together

ELECTRICAL CONDUCTIVE ELEMENT

This Application is the National Phase Under 35 U.S.C. §371 of PCT International Application No. PCT/AU2007/000972, which has an International filing date of Jul. 12, 2007, and which claims priority to Australian Patent application No. 2006903773, filed on Jul. 13, 2006; the entire contents of which are hereby incorporated by reference.

The present invention relates to an electrical conductive element that is suitable for the communication of electrical operating signals to a detonator. The present invention also relates to the manufacture of such a conductive element and to its use in a blasting system. The present invention further relates to a method of blasting using the conductive element and to a blasting system comprising such a conductive element.

In commercial blasting operations, such as at mines and quarries, large volumes of (working) explosives are initiated using a series of detonators. Typically, the detonator is positioned in a blasthole and working explosive then loaded around it. The detonators typically consist of a small metal cartridge that contains a quantity of explosive material. Detonation of this explosive material occurs in response to application of an appropriate initiation signal and provides the energy necessary to initiate detonation of the working explosives.

Detonators may be classified as being non-electric, electric or electronic in character. Non-electric detonators may be initiated by application of a relatively low energy shock wave to the explosive material in the detonator. The shock wave is conventionally generated using a shock tube and this takes the form of a hollow plastic tube that is coated on its internal surfaces with a reactive material. The tube is usually coated with a tough outer layer which provides superior tensile and abrasive properties and oil resistance. Shock tubes are thus physically robust and well suited to use in the kind of harsh environments typically found in blasting applications.

In electric and electronic detonators initiation takes place by transmission to the detonator of an appropriate electrical signal. This signal is generated at a blaster (blast box) and communicated to the detonator over copper-based conductors (wires). With electronic detonators a logger is also typically used during the process of hooking-up detonators in order to assign detonation delay times and perform testing functions. Communications between logger and detonator also usually takes place over copper metal (e.g. copper or steel) wire conductors. The integrity of electrical signals transmitted to the detonator during use is fundamental to correct detonator operation. To date, however, such conductor systems have not been able to reproduce in a simple format the robustness of shock tubes. Whilst metal copper wire conductors generally exhibit useful mechanical performance (e.g. abrasion resistance, cold bend and flexibility) and environmental stability requirements (e.g. resistance to water, artic oil, ammonium nitrate and UV), it would be desirable to provide a signal wire having improved properties, especially strength under load and elongation properties. Considering that detonators may be suspended by a signal wire 100 m or so down a blasthole, the signal wire needs to be sufficiently robust to survive falling rock strikes and the process of loading the blasthole with explosives and back filling with stemming. Conventional metal wire conductors tend to have limited robustness and can break occasionally resulting in costly remediation action to retrieve the detonator either prior to or following the blasting sequence. This problem may be mitigated by employing special loading techniques and/or reduced loading rates for the working explosive, but this can add to the cost and complexity of a blasting operation. The use of multi-stranded metal wire conductors, which offer multiple and alternate conducting pathways in the event of mechanical damage to the wire, may alleviate the problem. However, such wires can also have relatively poor physical/mechanical properties and their use can be costly.

Against this background, it would be desirable to provide means for transmitting electrical operating signals to a detonator that has the kind of physical robustness associated with the plastic-based systems conventionally employed for non-electric detonators and that retains functionality when subjected to the kind of demanding conditions encountered in a blasting operation. For example, use is likely to involve impact and tensile loading. It would also be particularly desirable to provide signal transmitting means at a cost that is at least equivalent to, and preferably less than, the cost of conventional copper-wired conductor systems.

Accordingly, in one embodiment, the present invention provides a conductive element suitable for the transmission of an electrical operating signal to a detonator, which conductive element comprises a conductive filler homogeneously dispersed in a polymer matrix. In principle the conductive element may take any form. Usually, however, it takes the form of a wire, and this is the form that will be referred to herein for the purposes of illustration.

The present invention relies on the use of a composite material to provide a conductive wire having desirable physical/mechanical properties and electrical conducting properties for use in a blasting operation for the transmission of an electrical operating signal to a detonator. It will be appreciated from earlier discussion that the conductive wire of the invention is intended for use with a conventional electric or electronic detonator. It follows from this that the conductive wire must have suitable electrical conducting characteristics for transmission of electrical operating signals that are required to control functionality of such detonators. The complexity of these operating signals may vary as between these different types of detonator and, possibly, as between different detonator designs of the same type. The conductive wire of the invention may be designed accordingly.

In its simplest form, for example when used in connection with an electric detonator, the conductive wire may be required to carry an electrical signal that controls detonator functionality based simply on some threshold electrical signal. On the other hand, when electronic detonators are being used, more complex electrical signals may be required in order to differentiate intended detonator functionality. In this case, the conductive wire may be required to carry a digital signal of a particular wave form (e.g. square, triangular) and/or current, without undue loss of signal integrity and resolution.

The conductive wire of the invention should also have the ability to allow transmission of appropriate electrical signals over possibly large distances, such as several hundreds of metres, without undue power consumption and loss of signal integrity and resolution. The characteristics of the conductive wire may also be designed with this in mind. For example, the conducting characteristics of a wire that is intended to be used in long lengths are likely to be different from a wire that is intended to be used only in shorter lengths. It is a further requirement that the conductive wire be compatible with existing control units, such as blasters and loggers, used in the field since the conductive wire is intended to be a direct replacement for a conventional copper wire based conductor. Thus, the conductive wire should be operational at the kind of power output levels of conventional equipment. For example;

Voltage<30V
Current<1000 mA
Frequencies in the range of 10 Hz to 1 MHz but typically 100 kHz
Temperature range −60° C. to +80° C.

It is known to formulate electrically conducting polymers for the purpose of protecting components against electromagnetic wave interference. However, none of the conducting polymers designed for this role are believed to be useful in the context of the present invention for transmission of electrical operating signals to control functionality of an electric or electronic detonator. This is at least because such conducting polymers would not be able to carry electrical operating signals over any significant distance whilst preserving signal integrity and resolution. Furthermore, these conducting polymers are unlikely to have the appropriate physical/mechanical characteristics to be robust enough for use in a blasting operation.

The physical/mechanical properties of the conductive wire are to a large extent attributable to the polymer used as matrix material, although the conductive filler may also contribute in this regard. The electrical conducting properties of the conductive wire are provided by the conductive filler component. This is homogeneously dispersed (distributed) throughout the polymer matrix in such a way so as to provide multiple conducting pathways for transmission of an electrical operating signal through the conductive wire. It will be appreciated from this that the microstructure of the conductive wire is an important aspect of the present invention. Thus, the conductive filler is distributed in the polymer matrix in a form and concentration to provide an interconnected conducting network (made up of the conductive filler component). It is this network that provides conducting pathways for transmission of electrical signals. Desirably, this network of conductive pathways is retained even when the conductive wire is subjected to the rigours of use, such as tensile loading, so that the functionality of the conductive wire will be preserved in the field. This means that only if some massive failure occurs, such as complete severing of the conductive wire, will signal transmitting functionality be lost.

The conductive filler may be selected from conducting particles (including nanoparticles), flakes, fibres, coated flakes and coated fibres, and useful species are commercially available.

The conductive filler may be particulate such as carbon black. Carbon fibres and carbon nanotubes may also be useful. Metallic nanoparticles, such as nickel nanoparticles, may also be useful. Typically, when in particulate form, the particle size of the conductive filler ranges from 10 to 100 nm.

The conductive filler may take the form of metal flakes, such as of aluminium, copper, silver, nickel, magnesium, chromium, tin, zinc, tantalum and alloys of two or more thereof.

As fibres, metal fibres may be used including fibres formed from aluminium, copper, silver, nickel, magnesium, chromium, tin, zinc, tantalum and alloys of two or more thereof. Stainless steel fibres may also be used, and this may be preferred due to fact that stainless steel is relatively inert to the kind of chemicals and pHs typically encountered in blasting conditions.

The fibres generally have a maximum length (longest direction) of about 10 mm, preferably 5 mm or less. The aspect ratio of the fibres (length divided by diameter) is generally from about 200 to about 1000, preferably from about 200 to about 750.

Use may also be made of conducting metal-coated flakes or fibres. These may consist of a metal (e.g. copper) core or a non-metal core (e.g. graphite, ceramic, mica, glass or polymer such as KEVLAR™) coated with a metallic layer, such as silver, nickel, aluminium, chromium, tin, lead, copper, gold, platinum, and the like, and alloys thereof such as brass. By way of specific example, silver-coated glass flakes and silver coated copper flakes or fibres may be used. The dimensions of the coated flakes and fibres are as referred to above for the uncoated flakes and fibres. The thickness of the metal coating on the flakes or fibres is usually from 0.1 to 2 µm.

Specific examples of conductive fillers that may be useful in practice of the invention together with their properties are included later.

The polymer useful in the present invention may be selected from a wide variety of materials depending upon the required characteristics of the conductive wire, such as tensile strength and impact resistance. The polymer may also be chosen to provide chemical (oil) resistance. It is preferable that the polymer and conductive filler are compatible with each other and here it may be desirable that there is a good level of adhesion in the conductive wire between the polymer and conductive filler. Without wishing to be limited, it is believed that good interfacial bonding between these components may be important to achieving suitable electrical conductivity. The extent of compatability between the polymer and conductive filler will also influence the physical/mechanical properties of the conductive wire. If the polymer and conductive filler are incompatible, it may be difficult to achieve suitable (homogeneous) dispersion of the filler in the polymer matrix and achieve the required conducting network. In practice the efficacy of any combination of polymer and conductive filler may be determined experimentally.

It may be possible to improve the compatibility and processability of certain combinations of conductive filler and polymer through the use of suitable coupling or sizing agents. Useful agents are known in the art and include, for example, silane and titanate compounds. When used such agents are generally applied to the conductive filler prior to blending with the polymer.

The use of certain types of functionalised polymer may also aid dispersion of the conductive filler. For instance, a graft-modified maeleic polyethylene polymer may be useful in this regard. It may also be the case that the conductive filler is adapted to aid dispersion. Thus, stainless steel fibres may be provided with a polyester sizing and this will enhance the ease with which the fibres may be dispersed in a polymer matrix as required.

Improvements can also be obtained by incorporating highly conductive phases in the polymer matrix using conductive polymers or non-compatible polymers incorporating the fibres, fillers etc discussed above.

As noted, invariably, the conductive element of the present invention will be provided in the form of a wire. The polymer useful for the polymer matrix may therefore be selected from extrudable polymers, including homopolymers and copolymers/terpolymers. This includes polymers that may be crosslinked after extrusion to provide enhanced properties, e.g. toughness. One skilled in the art of polymer technology will be familiar with the kinds of polymers that may be suitable for use in the present invention, though it will be noted that the efficacy of any particular polymer (and conductive filler) will normally be confirmed experimentally.

Examples of suitable extrudable (thermoplastic) polymers that may be used include polyolefins, such as low and high density polyethylenes, polypropylenes and cyclic olefins, vinyl polymers and copolymers such as PVC and ethylene-vinyl acetate (EVA), acrylonitrile-butadiene-styrene (ABS) copolymers and blends thereof, polycarbonates, nylons, such as nylon 11, polyesters, polyarylene ether sulfones and ketones, polyphenylene ethers, polyamide imides, polyetherimides and polystyrenes.

It may also be useful to employ an ionomer as the polymer matrix. Numerous ionomers exist, but by way of example the ionomer may be Surlyn®. This is an ethylene-methacrylic acid copolymer in which part of the methacrylic acid is neutralized with a metal ion such as zinc or sodium. The ions, which impart cross-linking ability to the polymer may provide benefits such as abrasion resistance, thermoformability and compatability/adhesion to metals. It will be appreciated that the latter property in particular may be advantageous in practice of the present invention.

The amount of conductive filler present in the polymer matrix is likely to vary as between different types of filler and on the intended use of the conductive wire. Here it should be remembered that the electrical conductivity of the wire is believed to be attributable to the presence of a network of conductive filler in the polymer matrix. The amount of conductive filler required to achieve this network, and to maintain the network when the conductive wire is subjected to the rigours of use, will probably vary as between different conductive fillers and possibly as between different combinations of conductive filler and polymer. The way in which the conductive wire is formed will also influence the formation of the requisite network of conductive filler, as will be discussed later. Typically, the amount of conductive filler included in the polymer matrix will be less than 50 wt %, preferably less than 40 wt %, more preferably less than 30 wt %, based on the total weight of the polymer and conductive filler. The amount of conductive filler required to provide desirable conducting characteristics will vary depending upon such things as the polymer matrix and the presence of conductive co-additives. Practically useful results have been obtained with loadings of conductive filler from 10 to 20% by weight.

The conductive wire of the invention may include two or more different types of conductive filler homogeneously dispersed in the polymer matrix. In this case the total amount of conductive filler is usually as stated above. In this embodiment, it may be useful to employ the same or different type of conductive filler having different aspect ratios, and this may lead to improved electrical conductivity.

In another embodiment of the invention, there is provided a method of making a conductive element as described herein, which method comprises homogeneously dispersing a conductive filler in a polymer matrix to form a blend followed by forming the blend into a desired shape.

As noted, the conductive element usually takes the form of a wire and this may be formed by extrusion through a suitable die of a blend of polymer and conductive filler. In this case it has been found that the way in which extrusion is carried out is likely to influence the formation of the required network of conductive filler. Without wishing to be bound by theory, it is believed that the extrusion parameters (screw design, extrusion temperature, die temperature etc.) must be selected and controlled in order to achieve the network of conductive filler that is believed to be important. Indeed, the selection of the extrusion conditions may be critical for optimum conduction of a signal as the wrong conditions may damage the conductive filler thereby impairing the ability to form a sufficient network. It has been found that conductive fibres may be especially prone to damage in this regard. Thus, when forming a conductive wire including conductive filler in the form of fibres, either a single or double screw extruder can be used. However, it is believed that a single screw extruder may offer the best balance between fibre damage and resultant signal conduction. In practice of the invention the extrusion conditions may therefore need to be manipulated in order to achieve optimum results. The effect of inclusion of conductive filler on the processing (extrusion) and final characteristics of the polymer will also need to be taken into account.

Other methods of strand or fibre production such as solution or melt spinning may also be used.

Typically, a conductive wire of the invention will include an outer sheath. This may be co-extruded with the blend of polymer and conductive filler and is of conventional material. The sheath may provide additional mechanical support, electrical insulation, environmental protection and abrasion resistance. Generally, conductive wires of the present invention, including any outer sheath, will have a diameter approximately the same as existing copper wire conductor systems so that the conductive wires are immediately useable without the need to modify connectors etc. used in conventional blasting systems. Generally, the diameter of the conducting portion of the conductive wire will be about 0.6 to 2.0 mm.

The invention is however not limited to traditional "FIG. 8" double strand extrusions seen in typical wire applications. Conductive layers may be extruded in concentric layers of conductive material and insulating material or could be extruded in multitudes of shapes and patterns, both single or multicore.

Desirably, the conductive wire of the invention will be as cheap as, if not cheaper than existing metal wire based conductors. Conductive wires in accordance with the present invention may also give superior properties to metal wire conductors. For example, in addition to the benefits already described, the conductive wires in accordance with the present invention may give improved spooling, weight reduction for reduced manual handling issues and easy tie-off at the collar.

To provide additional mechanical strength in demanding applications a strength member such as a nylon strand, drawn polyolefin strand or metal fibre, for example, may be included. Ideally this strand would have superior mechanical properties to the conductive strands and acts as a sacrificial member bearing any loading instead of the conductive strand.

The electrical conductivity of a conductive wire in accordance with the present invention may vary depending upon the intended distance over which an electrical operating signal is to be transmitted. For example, an electrical conductivity of about $10^2$ S/cm may be adequate to support signal transmission over a distance of up to 100 m. It should be noted however that the electrical conductivity of the conductive wire may vary under physical loading and the electrical conductivity should therefore be assessed with this in mind. The electrical conductivity referred to is the electrical conductivity of the conductive wire when in use, i.e. taking into account such things as tensile loading of the wire that is likely to be encountered in practice. The electrical conductivity is generally from $10^0$ to $10^2$ S/cm, preferably from $10^1$ to $10^2$ S/cm, as determined by the methodology described below under the heading "Conductivity Measurements".

Desirably, the conductive wire of the invention does not exhibit any significant signal loss over a distance of 100 m. In practice this may be assessed by whether or not the conductive wire retains the signal carrying capacity to control detonator operation using conventional signal generating (control) equipment and power supplies.

As noted above, the conductive wire is intended to be physically robust, especially under tensile loading. Typically, the conductive wire exhibits an elongation to break of at least 30%, for example from 30 to 100%, as determined by methodology described below under the heading "Tensile Properties".

The present invention also provides the use of a conductive element, for example in the form of a wire, as described herein in a blasting system to transmit electrical operating signals to an electric or electronic detonator. In this embodiment of the invention metal wire conductors commonly used in blasting systems for the transmission of electrical operating signals may be replaced with conductive wires in accordance with the present invention. The conductive wires may be connected to conventional blasting components, such as blasters, loggers and detonators using existing connectors, adaptors, and the like. The electrical signals that are transmitted through the conductive wires are of usual form required to control detonator functionality. In a preferred embodiment of the invention the detonator is an electronic detonator and the conductive wire is used to carry a variety of electrical signals that will differentiate detonator functionality.

In another embodiment, the present invention provides a blasting system comprising control equipment and a detonator, wherein the control equipment is in electrical signal communication with the detonator by a conductive element in accordance with the present invention. The control equipment may be any device, such as a blaster or logger, which is required to communicate electrical signals to a detonator to control detonator functionality. Invariably, the conductive element will take the form of a wire. Preferably, the detonator is an electronic detonator, in which case the control equipment may be a blaster and/or logger.

Embodiments of the present invention are illustrated in the following non-limiting examples.

In the following examples the various polymers and conductive fillers are referred to. A general description of these is given in the following table with the next table giving further details as to properties of the materials.

General Description of Materials and Suppliers

| Material | Grade/s | Supplier |
|---|---|---|
| Polymers | | |
| Nylon12 | 9005 | Degussa |
| LLDPE | LL920 | Qenos |
| HDPE | 3690 | Qenos |
| EVA | Ultracen (22% VA) | Tosoh Corporation |
| Surlyn | 9970, 8940, 9945, 8945 9650, 9520 | Dupont |
| Principle Conductive Filler | | |
| Stainless Steel fibre Conductive Co-Filler | C12E, C16E | BEKAERT |
| Carbon Black | Printex XE 2B | Degussa |
| VGCF | PR24-HT | Applied Sciences |
| Nickel Nanoparticle | 123, 110, 225, 210 | INCO |
| Ag coated copper flake | SC230F9.5, & SGF40F35 | Potters Industries |
| Ag coated glass fibre | SF82TF20, & SF82TF20 | Potters industries |
| Ag coated glass flake | SGF40F35, & SGF15F35 | Potters Industries |
| Carbon Nanotubes in Nylon 12 | MB4220 | Hyperion Catalyst |
| Polyalanine | DX | Panipol |

Conductive Filler—Key Properties

| Conductive filler | Description | Conductivity (S/cm) | % Ag Metal | Shape/ Aspect ratio | Mean Particle Size (microns) |
|---|---|---|---|---|---|
| Stainless Steel μ-fibre | Gr75/C12E - 75% Stainless Steel fibre, size: thermoplastic polyester Coating: ethylene-acrylic acid Zn ionomer Gr75/C16E 75% Stainless Steel fibre, size: PA12 Coating: ethylene-acrylic acid Zn ionomer | $10^4$ | — | Fibre 500 | 12 (diameter) |
| SF82TF20 | Silver Coated Glass Fibre | $6.3 \times 10^5$ | 20 | Tubular fibres | 130 |
| SF82TF8 | Silver Coated Glass Fibre | $2.9 \times 10^5$ | 8 | Tubular fibres | 130 |
| SC230F9.5 | Silver Coated Copper Flake | $1.0 \times 10^6$ | 9.5 | Flake | 27 |
| SC350F12 | Silver Coated Copper Flake | $5.0 \times 10^5$ | 13 | Flake | 67 |
| SGF40F35 | Silver Coated Glass Flake | | 35 | Flake | 40 |
| SGF15F35 | Silver Coated Glass Flake | | 35 | Flake | 15 |
| Carbon Fibre | | $10^2$ | — | 10-30 | 75000 nm |
| Carbon Black (CB) | — | $10^3$ | — | Spherical | 30-100 nm |
| Graphitized VGCF | — | $10^4$ | — | Fibre 100-1000 | 60-200 nm |
| Carbon Nanotube | — | $10^4$ | — | Fibre 100-1000 | 10 nm |
| Nickel Nanoparticles | — | $10^5$ | — | various | 50-1000 nm |
| MB4220 | Nylon 12 with fibril nanotubes (15%) | $1 \times 10^{-2}$ ($10^4$) | — | N/A | Filled Resin |
| Panipol | Conductive polyaniline Extrusion Grade in HDPE | $4 \times 10^{-3}$ | — | N/A | Filled Resin |

Compounding

Blending of the polymer and conductive filler(s) was conducted primarily using an Axxon single screw extruder equipped with an 18 mm screw and an L:D ratio of 38:1. Many blends, however, were pre-compounded using a twin screw counter rotating extruder (HAAKE/Berstoff; 25 mm, 36:1. Extrusion profiles and conditions for all additives tested in the respective polymer matrices are listed below in the following table for their standard "Dupont recommended" conditions.

| Matrix | Screw Speed (rpm) | Temperature Profile | | | | | |
|---|---|---|---|---|---|---|---|
| | | Zone 1 | Zone 2 | Zone 3 | Zone 4 | Zone 5 | Zone 6 |
| Nylon 12 - Vestamid 9005P | 216 | 210 | 200 | 190 | 180 | 180 | 180 |
| LLDPE - LL820 | 216 | 180 | 180 | 170 | 170 | 170 | 170 |
| EVA - UE633 | 216 | 120 | 130 | 140 | 150 | 150 | 150 |
| HDPE - HD3690 | 216 | 160 | 165 | 170 | 170 | 170 | 170 |
| Surlyn 9970 | 216 | 150 | 150 | 150 | 150 | 150 | 150 |
| Surlyn 8940 | 216 | 150 | 175 | 175 | 175 | 175 | 175 |
| Surlyn 9945 | 216 | 150 | 175 | 175 | 175 | 175 | 175 |
| Surlyn 9650 | 216 | 150 | 175 | 175 | 175 | 175 | 175 |
| Surlyn 9520 | 216 | 150 | 175 | 175 | 175 | 175 | 200 |

Injection Moulding

Injection moulding of coupons for mechanical testing were performed on a Battenfeld BA 800 CDC injection moulder employing the conditions listed below in the following tables.

| Polymer | Temperature Profile (° C.) | | | | | Cooling time (s) | Monitoring timer (s) | Vol (ccm) |
|---|---|---|---|---|---|---|---|---|
| | Melt | Nozzle | Zone 1 | Zone 2 | Zone 3 | | | |
| Surlyn - Surlyn 9970 | 185 | 185 | 185 | 185 | 175 | 50 | 10 | 15 |
| Surlyn - Surlyn 8940 | 185 | 185 | 185 | 185 | 175 | 50 | 10 | 15 |
| Surlyn - Surlyn 9650 | 195 | 195 | 195 | 195 | 185 | 50 | 10 | 15 |
| Surlyn - Surlyn 9945 | 185 | 185 | 185 | 185 | 175 | 50 | 10 | 15 |
| Surlyn - Surlyn 9520 | 195 | 195 | 195 | 195 | 185 | 50 | 10 | 15 |

| Polymer | Cavity Press. (bar) | Injection Press. (bar) | Holding Pressure - HP (bar) | | | | | | HP time (s) |
|---|---|---|---|---|---|---|---|---|---|
| | | | Profile point | | | | | | |
| | | | 1 | 2 | 3 | 4 | 5 | 6 | |
| | | | Time (s) | | | | | | |
| | | | 0 | 2 | 4 | 6 | 8 | 9 | 10 |
| Surlyn - Surlyn 9970 | 250 | 600 | 800 | 700 | 600 | 550 | 500 | 400 | 0 |
| Surlyn - Surlyn 8940 | 300 | 800 | 900 | 800 | 700 | 650 | 600 | 500 | 0 |
| Surlyn - Surlyn 9650 | 300 | 1000 | 800 | 700 | 600 | 550 | 500 | 400 | 0 |
| Surlyn - Surlyn 9945 | 350 | 900 | 950 | 850 | 750 | 700 | 650 | 550 | 0 |
| Surlyn - Surlyn 9520 | 350 | 1100 | 900 | 800 | 700 | 650 | 600 | 500 | 0 |

Conductivity Measurements

Conductivity was tested directly on extruded wire (10 m lengths) via a two probe method. Volume conductivity values were measured between two silver painted strips on the edges of each side of the sample. Measurements were made using the same multimeter on each sample. The dimensions of the sample were measured accurately using a micrometer and the bulk volume resistance was calculated from the dimensions and the resistance of the sample using the equation given below.

$$\text{Volume Conductivity (S/cm)} = (10*L)/(R*(r^2)*\pi)$$

where:
L=Length of cut strand (mm)
R=Resistance recorded on multi meter (Ω)
r=Radius of the cut strand (mm)

Physical and Mechanical Properties

Tensile Properties

Tensile properties were evaluated using an Instron tensile testing apparatus (5565) utilizing a 30 kN load cell, 50 mm/min strain rate and 5 repeats per sample as per ASTM D638. An external extensometer was used for independent modulus measurements as per ASTM D5938.

Following injection moulding, samples were stored for 24 hours in desiccated containers and tested "dry" as moulded. Generally the standard deviation was less than 2% for modulus and strength results.

Mechanical properties of materials in strand form were completed analogously making back correction of the material dimensions.

Impact Strength

Impact strength was determined us a Radmana ITR 2000 instrumented impact tester, Izod mode, Impact strain rate 3.5±0.2 msec, 10 repeats per sample, as per ASTM 256. Following injection moulding, samples were stored for 24 h in desiccated containers, notched according to the ASTM 256 standard and tested "dry" as moulded. The standard deviation in the measured results was generally less than 8%

Melt Flow Index

MFI testing was completed according to ASTM D1238 employing 5.0 kg load using a Davenport Melt Flow Indexer apparatus. A standard die was used for the tested matrices at the following temperatures.

| Polymer matrix | Temperature of Unit (° C.) |
| --- | --- |
| Nylon 12 - Vestamid 9005P | 230 |
| HDPE - HD3690 | 190 |
| LLDPE - LL820 | 190 |
| EVA - UE633 | 190 |
| Surlyn - Surlyn 9970 | 190 |

Strand Drawing

Extruded granulate was drawn (elongated) using an Instron tensile testing apparatus to simulate the effect of orientation during manufacture on the conductivity of the material (50 to 200 mm/min). Hot drawing simulation was completed in an environmental chamber. Five specimens each 50 mm in length were tested for conductivity, drawn to 100% elongation (or maximum strain for HDPE and PE Mix), then finally remeasured for conductivity. Alternatively an "on-line" conductivity measurement was made during the experiment by connecting a data logger to the multimeter to record conductivity with elongation in real time. This methodology simulated loading and hence extension of the wire during in-field application. With these latter experiments a minimum of 8 repeats per sample were performed.

EXAMPLE 1

HDPE Conductive Composite Wires

An evaluation of HDPE—stainless steel based composites was conducted. In the first instance the variation in composite conductivity with different initial stainless steel fibre lengths was investigated (FIG. 1). The results indicated that (1) a higher stainless steel loading lead to improved conductivity values and (2) improved conductivity values for similar loadings could be achieved by using stainless steel fibre bundles that were cut into longer lengths. These results are believed to be due to the fact that higher loadings increase the number of conductive pathways within the polymer matrix and the number of intimate electrical contacts leading to fewer resistive blocks.

Further, starting with longer fibres was thought to provide composites with a longer aspect ratio distribution following compounding. This hypothesis was supported by visual observations which demonstrate that stainless steel fibre length distribution was a critical parameter that influences the overall conductivity of the composite material. Following two passes through the extruder the stainless steel fibre aspect ratio was greatly reduced and in turn the conductivity of the composite also reduced. Indeed, starting with 3 mm stainless steel fibre lengths provided lower conductivity values compared to the use of stainless steel fibres having starting lengths of 5 mm or 6 mm.

X-ray tomography analysis was completed on the composites to gain a greater insight into the structure of the stainless steel network. The tomography results provided a detailed visualisation of the stainless steel fibre network within the composite material. The images suggest that not only were longer stainless steel fibres required within the matrix but also small stainless steel fragments added significantly to the overall network structure effectively linking the longer fibres together to reduce the inter-fibre resistance brought about by the highly resistive HDPE matrix.

EXAMPLE 2

HDPE Conductive Composite Wires

The effect of secondary lower aspect ratio conductive elements (eg silver coated copper) were investigated as a means of improving the network structure provided by the stainless steel fibres and hence the over-all conductivity of the system. FIG. 2 illustrates the effect of different secondary elements (and concentrations) at a constant 10 wt % stainless steel loading. Silver coated elements were preferred owing to their high intrinsic conductivity. Conductivity results from composites incorporating these secondary elements suggest that they are best employed at $\leqq 1$ wt % loading with silver coated copper (SC230F9.5) and silver coated glass fibre (SC82TF20) providing somewhat superior results to silver coated glass flake (SGF40F35 and SGF15F35).

2D X-ray tomography results from HDPE-stainless steel composites incorporating 0.5 wt % silver coated copper suggest that the secondary elements (under appropriate processing conditions) tended to disperse between the stainless steel fibres and not agglomerate, hence adding to the integrity and conductivity of the network.

Interestingly, at higher loadings of the silver coated additives, lower conductivities were found. This was possibly due to non-optimal extrusion conditions leading to non-optimal distribution of the elements and/or excessive grinding and hence size reduction of the stainless steel prior to plasticization of the matrix in the extruder. It may also be the case that in the case of silver coated glass (SF82TF20) fracture of the glass fibre could lead to a distribution of small fragments—this might explain why a higher loading of this filler could be tolerated.

FIG. 3 illustrates the effect of secondary element size and inherent conductivity. Lowering the percentage of silver per glass micro-fibre (from 20 to 8%) was found to reduce conductivity significantly whilst a reduction in particle size from an average of 40 to 15 µm with glass flake lead to only a marginal increase in conductivity, perhaps due to the brittle nature of the material which presumably fragments under the processing conditions. A similar rationale was employed with silver coated copper particles whereby an increase in particle size (27 to 67 µm) and a reduction in intrinsic conductivity was found to lead to an overall decrease in the conductivity of the composite material.

Secondary elements were also found to be effective in improving conductivity levels of HDPE composites with higher stainless steel loadings and longer initial fibre aspect ratio (see FIG. 4). The high shear screw did reduce the stainless steel fibre aspect ratio during compounding and hence starting with longer fibres lead to a longer on average distribution following compounding and higher conductivities. On the one hand as the percentage of stainless steel increased fibre packing/density should also increase, essentially forcing the fibres to interact more strongly and hence improve the conductivity through fibre touching, close contacts etc. However, stainless has significant density and 20 wt % corresponds to just 1.9 vol % once the stainless steel cover and size is considered. This is believed to be why the secondary elements actively improved the network even when "high" apparent stainless steel loadings were used.

EXAMPLE 3

Preliminary evaluation of processing variables including screw speed and temperature profile was undertaken for promising HDPE based systems with the results presented in FIG. 5.

In all cases no improvement in performance was noted. Decreasing the temperatures used for compounding either across the board or at the die face alone to increase back pressure and effective shear provided a corresponding reduction in conductivity presumably due to a reduction in stainless steel aspect ratio. Interestingly, increasing the temperature to reduce back pressure and improve the system rheology also did not improve the conductivity of the system over and above standard conditions. Considering the high shear nature of the screw configuration used these results are somewhat surprising, since higher temperature profiles should in theory have (i) hastened plasticization and reduced grinding of the metallic elements in the first few zones of the extruder, (ii) reduced melt viscosity and hence effective shear rate and (iii) improved the materials flow through the die. However at the same time it is possible that a certain amount of viscosity is required to maintain the systems "structure" through the die face and hence stainless steel network structure may have been modified by a too "fluid" composite system.

The effect of screw speed was also investigated both with standard and higher temperature profiles. Generally speaking increasing the screw speed from 220 to 360 rpm provided lower conductivities as expected. However, reducing the screw speed did not provide the benefit anticipated, although the drop in conductivity was much lower for systems not incorporating secondary elements and probably within the experimental reproducibility of the system.

EXAMPLE 4

Mechanical performance results from selected composite materials completed on ASTM type injection moulded coupons (not the extruded wire itself) are provided in the following table.

| Additive Loading Wt (Vol) | MFI (g/10 min) | Tensile Strength (MPa) | Elongation (%) | Modulus (MPa) | Impact (KJ/m2) |
| --- | --- | --- | --- | --- | --- |
| Virgin HDPE | 91 | 22 | 86 | 583 | 1.5 |
| 15% (1.4%) 5 mm Stainless Steel | 24 | 21 | 22 | 657 | 1.6 |
| 15% Stainless steel + 0.5% SF82TF20 | 18 | 20 | 30 | 607 | 1.8 |
| 15% Stainless steel + 0.5% SC230F9.5 | 19 | 22 | 30 | 668 | 1.9 |
| 15% (1.4%) 6 mm Stainless Steel | 10 | 22 | 32 | 668 | 1.9 |
| 15% Stainless steel + 0.5% SF82TF20 | 9 | 21 | 29 | 695 | 1.9 |
| 15% Stainless steel + 0.5% SC230F9.5 | 14 | 21 | 31 | 699 | 2.0 |
| 20% (1.4%) 5 mm Stainless Steel | 12 | 21 | 20 | 702 | 1.7 |

Although the composite materials incorporating different loadings of stainless steel and optionally secondary elements increased MFI values as might be anticipated, the incorporation of the fibres had surprisingly little impact on the tensile strength and modulus of the systems which might result from the very low volume percentages added. Further, on the whole, impact strengths were improved presumably due to the presence of fibres acting as crack stoppers and dissipating energy through fibre pull out mechanisms and extending crack propagation path lengths which might also be predicted based on the X-ray tomography results.

Elongation to break values were, however, significantly reduced. This reduction in performance was considered significant to the application requirements since one of the impact absorbing mechanism in service would be for the wire to stretch under load without fracture. This result coupled to other observations that elongated HDPE based composites were rendered non-conductive presumably due to poor filler matrix interactions (as suggested by the other mechanical performance results) and yielding of the plastic away from the fibres to form a high resistance block led to a subsequent brief investigation of polyolefin blends in an attempt to improve the materials electro-mechanical response.

EXAMPLE 5

Polyolefin Blends

Blending polymers is a well known technique utilized commercially to tune the properties of a polymeric system to the requirements of an application. Blends comprising HDPE were investigated (i) as a means of preferentially locating conductive elements into one phase of the blend to reduce their percolation threshold concentration (ii) as a means of improving the "draw" capacity for orientation purposes and (iii) to improve the mechanical properties including energy absorbing characteristics of the HDPE composites through the materials ability to elongate underload without fracture.

FIG. 6 provides conductivity values for HDPE blends incorporating 10 wt % stainless steel and conductive elements based on carbon nanotubes (CN, MB4220) and the intrinsically conductive polymer (ICP) polyaniline marketed as Panipol. Nanotubes were purchased as a master batch in PA12 (Nylon12) and as such a two phase material was produced with HDPE due to their incompatibility. With Panipol, the ICP was purchased as a HDPE master batch and the manufacturer claimed that on "let down" with more HDPE the material would form an interpenetrating network. The concept was that an interpenetrating conductive network would be more efficient in linking the stainless steel fibres and improving the conductivity of the system. In all cases the loading of Panipol and MB4220 was chosen to achieve a comparable level of secondary element, however although only a preliminary investigation was conducted no improvement in performance was noted even when compatibilizers (Surlyn and polyethylene-g-maleic anhydride (PE-g-Mah)) were added into the system to improve the compatibility and interaction between the phases and stainless steel fibres.

Polyolefin blends, however, were found to be effective in improving the electro-mechanical behaviour of the HDPE composite system. Although improvement in fibre-matrix adhesion through the introduction of a compatibilizer for example was one option considered to retain conductivity following elongation, the observation that LDPE based composites conducted following elongation provided an alternative and perhaps cheaper option to improve these characteristics. Presumably, this result occurred due to the longer molecular weight branches in the structure of LDPE compared to HDPE.

Conductivity results for various blend formulations prior to and post elongation (using INSTRON techniques under ambient conditions) are provided in FIG. 7. Under the test conditions HDPE based composite materials had only low draw capacity and were rendered non-conductive following the experiment. Although dropping more than an order of magnitude in conductivity LDPE composite materials at least did retain some conductivity and a superior draw ratio potential. Interestingly, even at low blend ratios the introduction of LDPE did significantly improve draw capacity to around the same values of LDPE in isolation and some conductivity hence providing a potential avenue to improve the performance of HDPE based composite materials.

EXAMPLE 6

Impact of Screw Design on Performance

It has been observed that the conductivity of a plastic filled with conductive elements is greatly dependant not only on the additives intrinsic conductivity, aspect ratio and morphology but also filler network distribution and number of close contacts within the matrix. The method and conditions used to mix (compound) the additives into the plastic are therefore of importance. The conductivity results presented earlier illustrate that different aspect ratio filler particles can act synergistically to improve conductivity if distributed appropriately. X-Ray tomography and SEM results supported this result since under appropriate compounding conditions the smaller aspect ratio elements such as silver coated copper appeared to orientate themselves at least partially between the stainless steel micro-fibres acting as a conductive bridge to reduce the inter-fibre resistance and improve the overall conductivity of the system. Similarly the screw design and processing conditions impact on the aspect ratio (ratio distribution) of the stainless steel micro-fibre used as the primary conductive element and the way in which they are distributed throughout the matrix. This example explores this latter point with a view of linking the screw design to the microstructure and hence conductivity of stainless steel filled conductive composites.

It has been found that only low conductivity composites could be prepared with stainless steel micro-fibres under very high shear conditions such as those provided by twin screw extrusion and low shear conditions such as those provided by single screw extrusion employing screw configuration "A" provided in FIG. 8. The former result was attributed to fibre aspect ratio break down due to shear whilst the latter result was attributed to inferior mixing and hence fibre distribution within the matrix since screw A was essentially devoid of dedicated mixing elements. Later results indicated that not only were the fibres not uniformly distributed within the matrix but also their aspect ratio was indeed reduced presumably since the screw had shallow screw flights in the feed section which may have lead to excessive grinding of the formulation prior to plasticization of the matrix.

Promising results were obtained from composite materials prepared by compounding formulations with the "higher shear" screw design C as shown in FIG. 8. This Screw incorporated both distributive and dispersive mixing characteristics in the form of Maddock and Porcupine mixing blocks and deeper flights in the feed zone. However, it was felt that the aggressive (narrow & shallow) channels of the mixing elements could be improved and tuned more closely to the inherent properties of the promising formulations. Although detailed flow analysis was not completed, a new screw was manufactured based on the characteristics of the most promising formulations with a view of retaining the stainless steel micro-fibre aspect ratio whilst still ensuring adequate distribution of the fibres or other elements within the host matrix. Hence the design was modified to incorporate:

a) less aggressive wider channelled mixing elements as shown for design B in FIG. 9
 b) deeper grooves surrounding the vent stage to improve the effective pumping ratio
 c) deeper screw flights in the feed section to reduce crushing/grinding of the materials prior to plasticization of the parent matrix
 d) hard chrome finish to improve material flow over the flights These alterations coupled with refinements in processing conditions provided the step jump in conductivity over and above that achievable with optimization of the material formulation alone when compounded with high shear screw.

Comparative fibre length distributions taken from Surlyn composites extruded through a 1 mm die using the three different screw configurations were obtained. Obvious differences existed between the fibre distributions which account for the observed difference in conductivity values. Fibre distributions of longer average length such as those obtained from a medium shear screw provided the best conductivity values. Considering the gently profile of the "low shear" screw the very short fibre distribution noted was surprising and potentially accounted for by (i) the surface finish not being chromed and hence the flow properties across its surface being different to the other screws and (ii) the shallow profile of the screw elements in the throat which presumably lead to significant grinding of the conductive elements and hence aspect ratio reduction prior to plasticization of the matrix. Previous cross-sectional microscopy results (not shown) have also indicated that the actual bulk distribution of the conductive elements throughout the matrix was not as uniform as when the formulations were compounded with the other screw designs.

Processing conditions such as extruder screw speed and temperature profile do play a part in terms of optimizing the performance of a given formulation. The retention of stainless steel aspect ratio fundamentally can be considered as one of the most critical factors in determining the overall magnitude of systems conductivity and dictates what avenues are available to manufacture the composite wire. For example, the conductivity of injection moulded composites has been found to be much less than extruded pellets from which they were derived, presumably due to a loss of orientation/alignment but also foreseeable due to fibre aspect ratio reduction.

The production of the conductive composite core should preferably be completed by direct compounding into a continuous wire not via a master-batch-let down technique in order to retain the fibre aspect ratio and to build into the system (in one step) the "optimal" network structure of the conductive elements present. The "complete wire system" manufacturing process could be completed using co-extrusion techniques to apply the insulation to the conductive core during its manufacture or alternatively via a "wire coating" process in a somewhat similar fashion to how conventional wire is produced now. This latter process, although potentially cheaper, has a number of undesirable handling steps which may introduce defects into the system and as such the former manufacturing process is preferred.

EXAMPLE 7

Surlyn Conductive Composite Wires

Selection to Surlyn based composite wire was made based on its superior mechanical properties with certain grades capable of being elongated (eg orientated) at ratios greater than 2:1 whilst maintaining high conductivities. Some formulation and manufacturing optimization was conducted employing the high shear screw design discussed earlier. However, considering that a step jump improvement in conductivity was provided by materials compounded with the medium shear screw design discussed earlier much of the optimization work was repeated on the development of Surlyn based conductive composite materials prepared using this design and making illustrative comparisons to materials compounded using the high shear screw based on earlier work.
Surlyn Grade Down Selection A variety of different Surlyn grades are available from Dupont which vary in acrylic acid content, extent of neutralisation and nature of the counter ion. These variables modify the mechanical and physical properties including melt flow index.

FIG. 10 outlines the conductivity of different Surlyn grades with concentrations of stainless steel. At 10 wt % the materials were close to their percolation threshold and as such the results are reasonably low and variable. However, at higher loadings the conductivity values were more reproducible and trends evident. When comparing the 20 wt % stainless steel loaded materials generally Surlyn grades with low neutralisation levels (eg: 9970 and 8940) lead to composite materials with lower conductivities, whilst high levels of neutralisation (eg: 9520) provided improved conductivity values. In the case where neutralisation levels were somewhat similar (eg: 9650 and 9945) and amount of acid content appeared to have some impact in that higher acid amounts provided higher conductivities which might be related to the overall ionic strength of the material (e.g. overall ionic character proportional to acid content and degree of neutralisation). Comparing the results for zinc and sodium neutralised grades (9945, 8945 respectively) with similar MFI values, acid contents and degrees of neutralisation some advantage was provided by zinc neutralisation. It is unknown if this result is due in part to the inherent conductive properties of zinc compared to sodium.

Based on the results employing HDPE as the matrix and low percentages of secondary elements, silver coated copper (SF230F9.5) and silver coated glass (SF82TF20) were also assessed with the different grades of Surlyn (FIG. 11). In all cases the secondary elements provided advantage presumably by reducing the resistance between stainless steel microfibres as discussed previously with the silver coated glass rod providing the most advantage. Some result variability was noted, for example the conductivity values for Surlyn 9650 containing just stainless steel was lower than expected. As a general comment although conductivity measurements were conducted on 10 m lengths to even out formulation variability the extruder feeding setup was not optimized and as such one would anticipate uncertainty in the order of 10% in overall conductivity based on feeding variability alone. The sharp increase in conductivity noted for Surlyn 9650 containing silver coated glass fibre was thought to be real and a synergistic point worthy of further investigation.

The conductivity results indicated that the particular Suryln grade employed played an important role in determining the overall conductivity of the stainless steel composite. This observation may (1) link the Surlyn acid content, degree of neutralisation and counter ion to the level of stainless steel intra-molecular interaction and hence network formed, (2) be related to MFI and hence processing or (3) support a parallel ionic mechanism between the stainless steel fibres and the matrix. In any case it was noted that Suryln grades with a higher level of neutralisation did provide superior conductivities and the potential to optimize any parallel ionic mechanism was further investigated. In the first of two experiments copper chloride was added to the matrix at low loadings to assess if its presence raised the conductivity values further but this was found to be unsuccessful with the conductivity found to decrease with increasing $CuCl_2$ loadings.

In a second experiment zinc and calcium stearate (common processing aides) were added separately at levels of 0.25% through to 2 wt % to the Zn neutralised Surlyn grade 9650. In both occasions, however, no improvement in conductivity was noted with these values decreasing almost linearly with high concentration of the processing agents. There was a possibility that the processing aides decreased the effective MFI of the composite systems leading to inferior stainless steel networks, however further investigation of this was considered to be outside the scope of the project and potentially dismissed based on the $CuCl_2$ results.

The results from model orientation experiments are provided in FIG. 12 for strain rates of 200 mm/min. As described in the Dupont literature Surlyn grades with higher acid contents for equivalent neutralisation levels are known to provide reduced elongation to break values. This trend continued with the stainless steel composite systems. For example Surlyn 9650 (and 9520 not shown) composite materials containing 20 wt % stainless steel provided a 100% elongation capacity whilst retaining excellent conductivity values following orientation. This result was in stark contrast to the HDPE based composite systems discussed earlier. Other Surlyn grades particularly those in the 8000 series (sodium neutralised) provided much lower levels of elongations prior to fracture and as such are not believed to be useful in the present invention.

Hot drawing was also evaluated for promising systems compounded using the high shear screw with the results from that study presented in FIG. 13. In evaluating the results presented the specific data points should be compared to provide a percentage change in conductivity, e.g. the specific value prior to and following elongation. This advice is provided since the test was difficult to perform and initial measurements were completed on small samples (not 10 m lengths), which invariably provided some inconsistency in terms of their overall magnitude. However, for data sets drawn under elevated temperature conditions the reduction in conductivity was 59±6% whilst those drawn under ambient conditions were 71±5% indicating that there was some benefit in the hot draw process. Further within experimental error (particularly for materials incorporating 20 wt % stainless steel) the percentage drop in conductivity did not appear to depend on the grade of Surlyn employed.

The most promising formulations in terms of producing a commercial product were provided by samples compounded with the medium shear screw design discussed earlier. The step jump improvement in conductivity provided by the (new screw) design and retention of higher aspect ratio fibres is illustrated in FIG. 14. Both the 9520 and 9650 grades of Surlyn showed stark improvement in conductivity values.

The most promising secondary elements discovered during the HDPE investigations were silver coated glass micro-fibre and copper at high silver contents were also investigated. Interestingly the 20% stainless steel, 0.5% silver coated glass fibre secondary element formulation again provided higher results than might have been expected reaching conductivity values above 150 S/cm around the hypothesised conductivity target for the project and greater than composite materials incorporating 30 wt % stainless steel (2.8 vol %, ~80 S/cm). This synergistic result was perhaps due to some critical network structure being formed under the processing conditions employed maybe through certain fracture of the silver coated glass into unique shaped particles. Increased loadings of the secondary element (FIG. 15) did not appear to provide advantage significantly greater than the stainless steel alone.

Although with HDPE based conductive composites it was shown that increasing the initial stainless steel fibre length from 5 mm to 6 mm provided a significant improvement in conductivity, the same results could not be repeated for the Surlyn 9650 and 9520 composites when they were processed using the high shear (FIG. 16) or the medium shear screw design (FIG. 17). At low fibre loadings (FIG. 16) a marginal improvement in conductivity was noted, perhaps through some retention of aspect ratio. At higher stainless steel loadings, however, this advantage was diminished with the high initial cut lengths (6 mm) providing a reduction in performance. These results suggested some compromising of the conductive network structure when the longer fibres were employed or perhaps some compounding issues and grinding of the fibres at the early stages of mixing. It is foreseeable that a larger extruder with deeper flights might not show the effect and perhaps some advantage may still be derived from stainless steel fibres with longer starting aspect ratios. Similarly, compounding 6 mm stainless steel fibres with the medium shear screw did not provide advantage over 5 mm cut length, and further the synergistic effect noted with the 20 wt % stainless steel, 0.5% silver coated glass fibre formulation was not repeated when 6 mm cut lengths were employed.

Previous to the medium shear screw being developed multiple compounding passes were evaluated in basic terms to assess if better dispersion of silver coated glass and copper would assist in improving their ability to link the stainless steel fibres when employed at high loadings. In these cases the secondary elements were first compounded using the single screw extruder (high shear screw) the material pelletized, dried and then a second pass (again high shear screw) was completed to incorporate (and hence preserve the aspect ratio of) the stainless steel micro-fibres. It was previously found that at very high loadings of stainless steel (30 wt %) the secondary elements did not provide additional benefit like that provided at lower loadings (20 wt %). Considering that the actual volume percentage loadings were actually small (2.8 & 1.9 vol % respectively) the result was some what surprising and it was thought that processing limitations might be responsible perhaps the low MFI value observed at high stainless steel loadings played a part in dispersion or perhaps the system had reached a limiting value. To test the first concept pre-dispersion of the secondary elements was investigated to "build in a structure" prior to addition of the stainless steel.

The following table compares the results for single and multiple passes of such systems (high shear screw) employing silver coated glass (SF82TF20) silver coated copper (SC2309.5) and carbon black. In these cases the best performance was noted from the silver coated copper for two passes. It was assumed that in the case of the silver coated glass two processing steps may actively crush the material and SEM images (not shown) suggested that the silver coating was not robustly adhered to its surface. When carbon black (CB) was employed its low inherent conductivity coupled with its low loading (below its percolation threshold when used in isolation) probably explains why no improvement was noted. However, silver coated copper did provide a marginal benefit presumably since (i) it is mechanically robust, (ii) it did not have an inherent aspect ratio and hence was not prone to aspect ratio reduction and (iii) presumably the silver-copper adhesion was strong and able to survive multiple shear histories.

Conductivities of composites prepared by two pass extrusion, pass one to disperse the secondary element and pass two to add the stainless steel compared with single pass methods.

| Formulation | Conductivity S/cm |
|---|---|
| Surlyn 9520 + 30 wt % Stainless Steel | 23 |
| Surlyn 9520 + 1% SF82TF20 (pass 1) + 30 wt % Stainless Steel (pass 2) | 21 |
| Surlyn 9520 + 1% SF82TF20 + 30 wt % Stainless Steel (pass 1) | 16 |
| Surlyn 9520 + 1% SC2309.5 (pass 1) + 30 wt % Stainless Steel (pass 2) | 36 |
| Surlyn 9520 + 1% SC2309.5 + 30 wt % Stainless Steel (pass 1) | 22 |
| Surlyn 9520 + 2% CB (pass 1) + Stainless Steel (pass 2) | 24 |
| Surlyn 9520 + 2% CB wt % Stainless Steel (pass 1) | 23 |

The conductivity result for 30 wt % Stainless Steel, 1% silver coated copper prepared by two extrusion passes represents the best conductivity value recorded using the "high shear screw design" at 36 S/cm. For comparison, 20 wt % stainless steel and 0.5 wt % silver coated glass provided conductivity values of ~150 S/cm when prepared in one compounding pass using the medium shear screw (FIG. 14). As will be discussed later the ability to employ lower additive loadings has significant benefit in terms of the overall cost to the product and with the resultant mechanical and physical properties. However, a conductivity of 36 S/cm was capable of carrying sufficient electrical energy to light up a 3V light globe below.

Surlyn Blends

Blending of polymers to improve the overall performance of the polymer composite system was shown to provide some advantage for HDPE based materials as a means of improving its electro-mechanical behaviour. Similar experiments were conducted with Surlyn, by firstly the introduction of phases containing (i) carbon nanotubes (CN) dispersed into Nylon12 (MB4220) and (ii) Panipol intrinsically conductive polyaniline (in HDPE) via twin screw processing. Intensive mixing was necessary to form the blend whilst stainless steel was incorporated in a secondary step via single screw extrusion (high shear screw) methods to retain the fibre aspect ratio (see the following table). In both examples the specific loading of polyaniline and carbon nanotubes were kept constant.

Although a potentially costly pathway forward in terms of the cost of the polyaniline and carbon nanotube additives alone, significant improvements in conductivity were noted and it was speculated that the conductivity improvement was due to a reduction in the inter-fibre resistance through the incorporation of the secondary phase.

| Conductivities of Surlyn (9970) blends | |
|---|---|
| Formulation | Conductivity S/cm |
| Surlyn + 15% Stainless Steel | 0.7 |
| Surlyn + 15% Stainless Steel + 30% MB4220 | 4.5 |
| Surlyn + 15% Stainless Steel + 6% Panipol | 2.4 |

SEM analysis was completed to verify that point. Comparing the phase domain incorporation of Panipol (polyaniline in HDPE) into the Surlyn matrix did not appear to provide a two phase structure and hence the interpenetrating network of HDPE-Surlyn-Panipol was not easily identified. When MB4220 (CN in Nylon12) were dispersed into Surlyn, however, SEM indicated that a two phase structure resulted and that the nanotubes did appear to be preferentially orientated in the Nylon phase. As such one would expect the Nylon12 phases to have a reasonably high conductivity. Under high magnification CN-Nylon 12 domains clearly linked the stainless steel fibres which no doubt resulted in the three quarter of a magnitude improvement in conductivity for the system. Interestingly incorporation of the MB4220 additive into analogous stainless steel—Nylon12 composites did not provide significant levels of improvement presumably due to the nanotubes being dispersed throughout the matrix and thus below a critical concentration (percolation) to provide improved electrical connection between the stainless steel fibres.

Based on the promising results for CN blends a similar methodology (e.g. blend formation via TS extrusion followed by stainless steel dispersion via a second single screw extrusion run—high shear screw) was investigated with carbon black as the secondary element due to its considerably lower price. In that case the initial dispersion of CB was completed employing single screw extrusion since previous work had demonstrated that a superior network and hence conductivities were achievable using that methodology. Adding carbon black via a two step process into either HDPE or Nylon 12 provided improved material conductivity over and above that provided by direct incorporation into the Surlyn matrix under the same two step process (FIG. 18).

Incorporation of 0.8 wt % CB into Surlyn provided no difference in conductivity to that provided by the stainless steel alone, presumably due to the fact that the overall loading was too low to conductively link the stainless steel fibres together (CN results in pure Nylon12). However, when CB was first blended into HDPE or Nylon12 and subsequently used to form blends with Surlyn 9650 dramatic improvements in conductivity resulted. For example 4 wt % CB in HDPE blended at a 20% ratio into Surlyn 9650 (0.8% effective CB concentration) prior to addition of the stainless steel fibres (20 wt %) improved the conductivity from 8 to over 20 S/cm whilst CB dispersed firstly into Nylon12 prior to blending with Surlyn gave a conductivity of 16 S/cm. Although a complex methodology the conductivity results were superior to formulations incorporating 0.5% silver coated additives at similar loading of stainless steel. SEM analysis of fractured surfaces, similar to the results presented above for carbon nanotubes, did support the preferential localisation of CB into the minor phase, hence lifting its effective concentration to values above that required for percolation (presumably) to provide additional electrical pathways to connect the stainless steel fibres.

Improved conductivity values were achieved using Surlyn blends when the formulations were compounded with the single screw extruder "high shear screw". These trends were not repeated when the medium shear screw was employed. In this latter case bench mark materials incorporating just stainless steel alone had significantly higher conductivities (42 relative to 8 S/cm) with this value much higher than the best "blends" prepared using the "high shear screw" design in the final compounding step.

Since compounding using the medium shear screw design provided such high conductivity values it was felt that the inherent conductivity of CB was too low to make a significant difference and hence nano-nickel particles which also form a chain like structure were assessed again using a 2 vol % loading (FIG. 19). However, no improvement in performance was noted. Considering that the stainless steel network in its own right did provide a very high conductivity it was speculated that the conductive pathways were well established and the introduction of phases of varying conductivity did not provide additional benefit unlike very small concentrations of very highly conductive elements such as the silver coated copper and glass which were still able to provide some benefit in terms of decreasing the inter-fibre resistance between the stainless steel fibres. Indeed that hypothesis was somewhat supported by the only system capable of lifting the conductivity in the blends was that incorporating silver coated copper during the multiple extrusion steps (re: result present in Table 2) which provided a conductivity of approximately 58 S/cm when incorporated in Nylon 12 prior to compounding into Surlyn 9650. Silver coated glass was not used in that study since previous results had indicated that it was susceptible to mechanical degradation during multiple processing runs.

Considering the manufacturing cost associated with multiple pre-compounding stages and the fact that superior results could be obtained using the medium shear screw design (see FIG. 13) with only one compounding pass blending technologies may not be preferred. Utilizing the medium screw design provided the potential to directly compound and form the conductive core for modification into a complete wire system via either a secondary over-coating process or more preferably by simultaneous co-extrusion methods.

Processing Conditions Refinement and Production of Thin Wires

To this point all conductive composite wires were prepared at a 3 mm strand diameter and conductivity testing completed on 10 m lengths, however for certain applications, for example for use in conjunction with an electronic detonator system strand diameters preferably less than 1 nun and optimally around 0.7 mm in diameter may be required for practical application.

Preliminary optimization of the processing conditions used to prepare the larger 3 mm diameter wires were completed using the high shear screw and these directly transferred to the medium shear screw without further modification. It was found that increasing the temperature profile from "150 zone 1, 175° C. flat" profile for Surlyn 9650 and "150 zone 1, 175 flat and 200° C. die" for Surlyn 9520 reflecting their respective MFI values of 5.0 and 1.1 g/10 min respectively (190° C./16 Kg) to a profile of 275 zone 1 and 225° C. die provided advantage in terms of improved conductivity results compared with the other profiles explored (e.g. 250 flat—15 S/cm, 275/225° C. profile 27 S/cm. Note: in all cases the throat section was water cooled to prevent blockage from pre-plasticization). These profiles reflect the reduction in viscosity noted when stainless steel composites were formed. Further, the profile probably increased the rate of plasticization and hence reduced mechanical grinding and presumably aspect ratio reduction of the stainless steel fibres whilst the cooler die assisted haul off and dispersive mixing. Performance was found to be much less impacted on screw speed and hence the rate at which material transferred through the barrel. High screw speeds (eg 216 rpm) could be tolerated without high back pressures, although it is conceded that much lower screw speeds would be necessary for larger diameter extruders.

Thinner diameter wires were produced using the medium shear screw configuration discussed earlier and prototype brass dies for quick turn around time. It should be noted that the production of thin strands particularly those below 1 mm diameter was considered to be on the limit of the extruder's specification. In these cases the screw speed had to be markedly reduced to minimize back pressure. Importantly, the conditions that were found to provide the highest conductivities were not necessarily those best for strand (processing) stability and thus a trade off was necessary between performance and collection of longer length strands.

Results from processing condition optimization experiments for the preparation of Surlyn—20 wt % stainless steel composites at a 1 mm diameter are provided in FIG. 20. Standard processing conditions for the two selected Surlyn grades are provided earlier. It remains unclear why for analogous temperature profiles occasionally certain screw speeds provided low conductivities (eg: 72 rpm Surlyn 9650 standard temperatures), although issues in terms of filtering of additives at the die face and take off inconsistencies leading to strand in-homogeneity may contribute to those spurious results. In terms of maximizing conductivity generally better performance was provided by the standard processing temperatures or those slightly elevated. Too low a temperature profile provided excessive melt pressure, whilst high temperatures tended to filter the stainless steel fibres over time due to the lower viscosity of the system and moderate levels of interfacial adhesion between the fibres and the matrix.

In practice it is important to tune the processing conditions to match the inherent characteristics of the formulation and the extruder design. Extruding through the 1 mm die at 108 rpm increased back pressure and providing lower conductivity values compared with screw speeds of 25 rpm. Although no image analysis was completed, assessment of the stainless steel fibres following extrusion of those samples and pyrolysis to remove the Surlyn matrix did not show glaring differences in fibre aspect ratio with both samples showing a distribution of longer fibre lengths. As such the order of magnitude difference in conductivity must result to a large extend from the quality of the conductive network structure produced, both in terms of the electrical connections as well as on a macro scale via variation in formulation throughout the wires length.

The following table illustrates the impact of die aperture size and screw speed on extruder back pressure for Surlyn containing 20 wt % stainless steel.

| Conditions | Pack Pressure Psi |
|---|---|
| 216 rpm, 3 mm die | 1950 |
| 25 rpm, 1 mm die | 2000 |
| 54 rpm, 1 mm die | 2502 |
| 72 rpm, 1 mm die | 2816 |
| 108 rpm, 1 mm die | 3118 |

A comparison between the conductivity values of various Surlyn formulations compounded through 3 mm and 1 mm diameter dies employing the medium shear screw design and best processing conditions determined for the formulation is provided in FIG. 21. Although within experimental error the conductivity trends were similar between the 3 mm and 1 mm dies the latter consistently provided marginally lower conductivities. Although surprisingly even 30 wt % stainless steel could be extruded through the 1 mm die, it was much lower in conductivity than expected based on the 20 wt % loading results and on removal of the die some stainless steel filtering had occurred. The sharp synergist effect noted in formulations containing silver coated glass fibre and 20 wt % stainless steel at 3 mm strand diameters were not as spectacular when the system was processed through a 1 mm aperture. However, further improvements in the conductivity and strand consistency of 1 mm wire may be achievable through properly engineered and configured processing equipment. In particular extrusion back pressure and die design have the potential to alter the conductive network structure, if not the fibre aspect ratio distribution as well and control over these designs should provide improved overall performance and a more robust product.

Considering the promising results obtained from the 1 mm die a further series of dies were manufactured (again without detailed flow analysis) to assess in general terms what the limiting value of strand diameter was for stainless steel based Surlyn composite materials. FIG. 21 provides details on that limiting value. Extrusion of Surlyn composite materials through a 0.5 mm diameter die was complicated and tedious. For the Surlyn 9650 strands of 10 m were able to be produced at loadings up to 15 wt % stainless steel although the system was not stable and the die periodically blocked up. As indicated by the different strand lengths measured, the formulation was not homogenously produced over time with longer lengths providing much lower conductivities than that measured over shorter distances. Surlyn 9520 composites, however could not be extruded into long lengths with measurable conductivity, presumably due to the inherent lower MFI of this grade (1.1/5.5 g/10 min. 190° C./2.16 Kg) which complicated flow through the die.

FIG. 23 provides the conductivity values obtained from formulations containing 20 wt % stainless steel extruded through a 0.7 mm die under different processing conditions. Somewhat surprisingly the 0.2 mm difference in diameter greatly assisted in providing stable processing although 20 wt % was seen as the upper limit of the stainless steel loading.

Although distinct trends were not readily extracted from the study, generally speaking Surlyn 9650 performed on a whole better at lower extruder screw speed whilst the 9520 grade appeared to produce higher conductivity composite materials when processed at higher screw speeds. It remains unclear why this result occurred, however high screw speeds and consequently back pressures may have acted to marginally reduce the stainless steel aspect ratio to provide more homogenous compounding. Further the 9520 grade appeared to have superior melt strength (re: 9650) and as such it was possible that the high screw speed and hence through put rates that were possible due to the higher level of extrusion stability provided a superior network structure and alignment of the fibres. Generally, standard or slightly elevated processing temperatures provided the best results although it should be noted that too high a die temperature leads to extrusion instability presumably due to melt strength considerations as well as a higher likelihood of stainless steel filtering at the die face, whilst low die temperatures had the potential to block up over time due to "freezing" of the material. As with the comments provided for the 1 mm die trials, the extrusion conditions providing the best conductivity over 10 m lengths were not always those which provided the greatest extrusion stability and as will be discussed later a compromise in terms of performance and processability is needed to be reached for commercial application of the technology.

Considering the high back pressures noted when extruding through small dies, avenues to reduce the back pressure and improve the stability of the extrusion were undertaken. It was felt that a compromise in the initial stainless steel fibre length might assist in extruding narrow wires since they had the potential to flow through the die more readily and inturn might form a superior network structure and hence higher conductivities. FIG. 24 provides comparative conductivity measurements and extruder back pressure values from Surlyn 9960 20 wt % stainless steel conductive composites incorporating stainless steel fibre lengths cut at 5, 4 and 2.5 mm lengths. In terms of the 1 mm die increasing the fibre length provided increasing back pressure, although conductivity values were not affected with the conductivity values increasing proportionally to the initial fibre aspect ratio. In terms of the 0.7 mm die the results were not so clear cut and although back pressure again increased in line with the 2.5, 4 and 5 mm cut lengths some small advantage was potentially provided by using 4 mm as apposed to 5 mm cut lengths.

Generally lower conductivities were achievable with wires prepared from the 0.7 as apposed to the 1.0 mm die presumably due to inferior connective network formations again possible through stainless steel aspect ratio reduction or alignment issues as the material enters/exits the die. Although on the one hand narrow dies might be expected to assist in developing a well aligned structure, turbulent flow of the material prior to entering the die may lead to non aligned fibres being compressed and crumpled rather than extruded and aligned uniformly.

Extrusion of 100 m Conductive Composite Wire

Commercialisation of the conductive composite technology requires that the compounding is stable and capable of providing uniform formulations over literally hundreds of kilometres. As a first step in demonstrating the scalability of the process, conductive cores at different diameters were prepared at 100 m lengths using the most stable processing conditions found for the medium shear screw design. The conductivity results for the selected grades of Surlyn are provided in FIG. 25 with the processing conditions employed for their manufacture presented in the following table. Conductivity values over ten metres were collected immediately prior to and following the 100 m collection in an attempt to gain a picture of the overall consistency of the formulation through the extruder over time.

Interestingly under the conditions employed the 1 mm diameter strand conductivities were similar to those of the 3 mm diameter strands which provides a very positive outcome for commercialisation of the product. In both cases and for both Surlyn grades good formulation consistency was obtained over time with Surlyn 9520 providing marginally superior performance in terms of overall conductivity and consistency. Surprisingly Surlyn 9650 did not conduct over 100 m which presumably resulted from some complication during processing. Analysis of the strand at various points to assess if a processing issue lead to a high resistance "blockage", for example due to a stainless steel loaded region, did not uncover the cause of the problem. However the Surlyn 9520 grade did provide samples that were conductive although the conductivity values dropped from approximately 40 S/cm (1 mm die) to under 10 S/cm (0.7 mm die) for the same formulation.

Processing conditions employed to prepare 100 m length conductive composites at different strand diameters.

| Formulation | Zone 1 | Zone 2 | Zone 3 | Zone 4 | Zone 5 | Zone 6 | Screw rpm |
| --- | --- | --- | --- | --- | --- | --- | --- |
| 9650 (3 mm) | 275 | 255 | 235 | 225 | 225 | 225 | 216 |
| 9520 (3 mm) | 275 | 255 | 235 | 225 | 225 | 225 | 216 |
| 9650 (1 mm) | 150 | 175 | 175 | 175 | 175 | 150 | 72 |
| 9520 (1 mm) | 250 | 235 | 225 | 215 | 215 | 215 | 72 |
| 9650 (0.7 mm)** | 150 | 175 | 175 | 175 | 175 | 150 | 54 |
| 9520 (0.7 mm) | 150 | 175 | 200 | 200 | 200 | 200 | 72 |

**no conductivity over 100 m

To ascertain why the difference in conductivity might have resulted Surlyn 9520 conductive composites at 3 mm and 0.7 mm diameters were pyrolysed at 500° C. to investigate the stainless steel fibre lengths following extrusion. The 3D stainless steel network formed within the Surlyn matrix was preserved following pyrolysis and provided a vivid illustration of the initial concept proposed for the project of multiple conductive pathways and indeed supported the X-Ray tomography results.

Several portions of the networks were extracted and with careful derangement of their ternary structure representative fibre lengths were imaged. Whether the material was extruded through a 3 mm or 0.7 mm die a range of fibre lengths were evident. No significant difference in fibre aspect ratio was readily identified even though higher conductivity samples were provided at 3 mm diameters. Most likely a superior stainless steel network formed in the larger diameter samples and this provided more conductive pathways with less resistive blockages compared to the 0.7 mm diameter sample. However, more compression of the fibre network was noted with the 0.7 mm diameter strands and as such even though the aspect ratio of the fibres might be large the rapid material velocity through the die have lead to some fibre "squashing" as discussed above. This effect might be improved with the use of 4 mm instead of 5 mm cut length stainless steel fibre lengths.

Electrical Behaviour for Commercial Electronic Detonator Application

A square wave signal is employed for operation of Orica's i-kon electronic detonator and that system is relatively intolerant to any modification to the waveform shape. Retention of the signal either in terms of a reduction in its intensity through resistance in the wire or via capacitance to change the waveform shape would therefore present a serious obstacle.

Preliminary assessment of the conductive core's ability to act as a reactive component in the system (e.g. through it showing capacitance) was assessed.

In tests a square wave of amplitude 5 volts peak to peak was applied to two different lengths of Surlyn stainless steel composite samples (>$10^1$ S/cm) (1 m and 10 m). The waveform was set to the following frequencies: 3 Hz, 30 Hz, 300 Hz, 3,000 Hz, 30,000 Hz and 300,000 Hz. The findings were that other than slight amplitude reduction due to the resistive load of the 'wire' there was no noticeable change to the waveform shape implying that the 'wire' did not introduce a reactive component to the circuit. A series of tests were also conducted on different samples to assess changes in waveform. These results indicated that 10 m lengths of HDPE stainless steel composites of conductivity in the $4 \times 10^0$ S/cm range did not distort the wave form.

Another critical issue was seen as the connectivity of the composite wire to the electronic loggers and detonators. Ideally this would be done using the existing "crimping" connectors to join wires and ideally a direct connection to the logging units would be possible. When thin conductive composite cores are utilized (e.g. $\leq 1$ mm diameter) conventional crimping connectors and a direct connection to the logger units are viable. Although studies were performed on samples of non-optimal conductivity the images illustrated that the logging unit recognised the detonator and as such electrical communication between the devices was possible using the conductive composite wire even without insulation applied to it. Further improvement in performance may result when the core is over-coated with insulation due to the lowering of electrical interference.

EXAMPLE 8

The concept of using a polymer composite core to enable multiple rather then a single conductive pathway and hence to provide improved mechanical or more specifically electromechanical robustness under loading was investigated under controlled conditions. A preferred mechanism for the wire to "resist" mechanical loading would be for it to elongate without fracture mechanically resisting fracture. This example was conducted to examine whether conductive composite materials in accordance with the present invention would retain their conductivity properties during mechanical loading and hence elongation.

To probe the electrical properties of Surlyn based conductive composite wires containing 20 wt % stainless steel and optionally secondary elements, a series of elongation experiments were conducted attaching a multimeter and data logger to the system to map how the material's conductivity changed with increasing strain. A strain rate of 50 mm/min and 3 mm diameter strands were employed since with the insulated system they were more mechanically robust in the jaws of the Instron tensile tester. A 50 second test represented a 100% elongation to the gauge length. It should be noted that due to the small sizes of the samples and high uncertainty associated with placement and contact between the connectors the relative conductivity values between different samples should be dismissed (e.g. how high or low they are) and rather the change in conductivity over time (increasing elongation) monitored to assess how this property altered form the starting point value. FIG. 26 demonstrates that point, with at least 8 separate runs completed to generate the average curve provided in FIG. 27.

FIG. 27 illustrates that under the test conditions all of the formulations showed a slight increase in conductivity up to an elongation of approximately 20% presumably resulting from alignment of the fibres and enhanced electrical contact. Further elongation tended to decease the conductivity back to the original starting point value (approx). In the case of the composites containing silver coated glass as a secondary element, at the end point of the experiment the final conductivity value on average was somewhat higher than the original again pointing to the unique synergistic characteristics of this formulation as has been discussed previously. The electromechanical behaviour illustrated in FIG. 26 in many ways does validate the original concept proposed, that is: a "plastic composite" wire with multiple electrical pathways providing a more robust wire format for signal transmission than a conventional single core wire.

EXAMPLE 9

Mechanical (Physical) Properties of Surlyn Conductive Composites

The mechanical properties of Surlyn conductive composites were initially completed on injection moulded dog-bone samples according to ASTM standards. This was seen as a more useful test for comparison purposes in the first instance even though (1) the end product is a wire (2) injection moulding provides a change to how the stainless steel and other elements are distributed with the plastic (extrusion through a die into a wire as apposed to the flow properties expected from a melt on injection into a cavity) and (3) the secondary processing steps can alter the stainless steel aspect ratio. Unless indicated the majority of the injection moulded materials tested were compounded using single screw extrusion technologies and high shear screw design, whilst studies on the composite strand (later) were prepared using the medium shear screw. In all tests standard deviations (SD) were calculated, however, for presentation simplicity these may be summarised as MFI SD<5%, Tensile Strength and Modulus SD<2%, Elongation SD<10%, Impact Strength<8%.

The following table compares the mechanical performance and MFI of different Surlyn grades and composites thereof prepared with 15 wt % (~1.4 Vol %) stainless steel loading. The change in properties of the different Surlyn grades match the trends indicated in Du Pont literature in terms of the impact of the materials properties with counter ion (8000 series—sodium, 9000 series—Zn), acid content, degree of neutralisation and MFI. A reduction in MFI was noted for the composites as expected since although the vol % loading was low the network structure and moderate levels of matrix-fibre interaction between the ionomer and stainless steel retarded the material flow under the test conditions. Interestingly the presence of the stainless steel had only a minor effect on tensile strength and apart from the 9970 grade their elongation to break values. Modulus values were increased by approximately 25%, however the most surprising result was that the materials impact strength (apart from the 8940 grade which reduced slightly) was simultaneously improved. The presence of the fibres and moderate fibre-matrix adhesion possibly improved impact strength values through many varied energy absorbing mechanisms such as fibre pull out and crack bridging mechanisms and crack path length extension considering the complex network structures formed within the matrix.

| Formulation | MFI (g/10 min) | Tensile Strength (MPa) | Elongation (%) | Modulus (MPa) | Impact (KJ/m2) |
|---|---|---|---|---|---|
| 9970 | 46 | 17 | 650 | 92 | 58 |
| 9970 + 15 wt % SS | 11 | 15 | 354 | 125 | 65 |
| 8940 | 10 | 22 | 337 | 202 | 48 |
| 8940 + 15 wt % SS | 2 | 23 | 394 | 215 | 40 |
| 9650 | 16 | 18 | 256 | 162 | 31 |
| 9650 + 15 wt % SS | 4 | 19 | 245 | 207 | 47 |
| 9520 | 3 | 23 | 169 | 167 | 11 |
| 9520 + 15 wt % SS | 2 | 21 | 168 | 203 | 21 |

Analysis of the selected Surlyn grades was also conducted for promising formulations containing 20 wt % (1.9 vol %) to 30 wt % (2.81 vol %) loadings of stainless steel and optionally 0.5 wt % of silver coated glass (SF82TF20) or silver coated copper (SC230F9.5) (see the following table). Similar trends were observed to those presented in the preceding table albeit the magnitude was increased. As a general point the presence of the secondary elements added little impact to the mechanical performance of the system within experimental uncertainty. Interestingly for the 9520 grade increasing the stainless steel loading to 25 wt % provided a 5 fold improvement in impact properties with this value slightly diminished at a loading of 30 wt %. It is assumed that similar toughening mechanisms were operating to those described above for 15 wt %. Tensile strength values were only marginally reduced at a 20 wt % loading and importantly elongation to break even at a 30 wt % loading of stainless steel reduced by less than 25% over the virgin matrix. These values coupled to the high conductivity results suggest only moderate fibre matrix adhesion occurs which is supported by SEM images which show the fractured surfaces following impact testing. In these images substantial stainless steel fibre pull out was evident and indeed little matrix appeared to be adhered to the fibres.

| Formulation | MFI (g/10 min) | Tensile Strength (MPa) | Elongation (%) | Modulus (MPa) | Impact (KJ/m2) |
|---|---|---|---|---|---|
| 9650 | 16 | 18 | 256 | 162 | 31 |
| 9650 + 20 wt % SS | 2 | 15 | 197 | 185 | 65 |
| 9650 + wt20% SS + 0.5% SF82TF20 | 2 | 14 | 212 | 189 | 64 |
| 9650 + 20 wt % SS + 0.5% SC230F9.5 | 2 | 14 | 206 | 197 | 63 |
| 9520 | 3 | 23 | 169 | 167 | 11 |
| 9520 + 20 wt % SS | 1 | 21 | 149 | 267 | 42 |
| 9520 + 20 wt % SS + 0.5% SF82TF20 | 1 | 20 | 156 | 229 | 39 |
| 9520 + 20 wt % SS + 0.5% SC230F9.5 | 1 | 19 | 171 | 210 | 37 |
| 9520 + 25 wt % SS (2.35) | — | 19 | 135 | 258 | 56 |
| 9520 + 30 wt % SS (2.81) | — | 18 | 130 | 234 | 47 |

When material became available a comparison was also made between the mechanical performance of promising formulations compounded with the high shear (H/s) and medium shear (M/s) screw designs (see the following table). Although similar trends were apparent generally material prepared using the medium shear screw configurations were stiffer, exhibited somewhat lower elongation to break values and lower impact strength than the material prepared with the high shear screw. This data combined with stainless steel aspect ratio results provides further confirmation that the medium shear screw retained longer fibre length distributions. For the injection moulded samples it was not possible to infer additional information about the network structure differences between the two compounding designs since this architecture would be lost during injection moulding.

| Screw | Formulation, wt % 5 mm SS (vol %) | Tensile Strength (MPa) | Elongation (%) | Modulus (MPa) | Impact (KJ/m2) |
|---|---|---|---|---|---|
| | 9520 | 23 | 169 | 167 | 11 |
| M/s | 9520 + 20% SS (1.88) | 22 | 175 | 245 | 29 |
| M/s | 9520 + 20% SS (1.88) + 0.5% SF82TF20 | 21 | 123 | 309 | 30 |
| H/s | 9520 + 20% SS (1.88) | 21 | 149 | 267 | 42 |
| H/s | 9520 + 20% SS (1.88) + 0.5% SF82TF20 | 20 | 156 | 229 | 39 |
| | 9650 | 18 | 256 | 162 | 32 |
| M/s | 9520 + 20% SS (1.88) | 16 | 171 | 250 | 57 |
| M/s | 9520 + 20% SS (1.88) + 0.5% SF82TF20 | 16 | 175 | 245 | 54 |
| H/s | 9520 + 20% SS (1.88) | 15 | 197 | 185 | 64 |
| H/s | 9520 + 20% SS (1.88) + 0.5% SF82TF20 | 14 | 212 | 189 | 63 |

EXAMPLE 10

Strand Porosity and Impact on Performance

A commercial conductive composite core wire would most probably be produced by a simultaneous "on-line" compounding and over-coating co-extrusion process. Defects in the core (or over-coat) would have the potential to reduce the mechanical performance of the system. The impact of voids or porosity was not an issue for the injection moulded samples since the high pressure process provided defect free samples for assessment. It is well known that voids or porosity in composite systems can lead to inferior mechanical performance since there is the potential for these sites to act as crack initiation points although this effect is often more significant for brittle rather than ductile matrices such as Surlyn. Indeed strand elongation experiments did demonstrate that high levels of elongation were possible on the composite strands themselves without fracture under the conditions employed.

Porosity has been noted for Surlyn composites cut at ambient conditions. Although some smaller "holes" no doubt resulted from fibre pull out during the cutting process it remained unclear what caused the larger defects. It was hypothesised that moisture or trace decomposition products were responsible. Surlyn grades are hydroscopic and as such come pre-packaged in foil lined bags ready to process. However considering that generally low volume runs were completed, the Surlyn matrix was exposed to the atmosphere and as such was dried prior to use typically at 70° C. in a conventional oven incorporating desiccant. Advice from the fibre supplier was that there was no need to dry the stainless steel micro fibre even though they come encapsulated in a Surlyn matrix and have a polyester thermoplastic sizing agent added to their surface.

Preliminary studies to remove strand porosity included opening of the venting port on the extruder with the hope that volatiles produced would be release and the resultant strand density increased. However, although the medium shear screw design had a favourable pumping ratio surrounding the vent, material still flowed freely through that port hence negating its effect to degas the system. Considering that compounding was performed on an 18 mm extruder increasing the pumping ratio around the vent relied on making the screw thinner at that point which inturn compromised its mechanical strength. Using a larger and specifically design extruder would assist in obtaining higher pumping ratios and hence the venting option may well prove to be an effective mechanism to reduce porosity.

Considering that either using Surlyn from a fresh bag or material that had been dried extensively in a hopper dryer at low dew point did not improve the porosity attention turned to the stainless steel bundles. An assessment was made of the materials via (1) pre-drying them under different conditions (2) assessing weight loss gravimetrically to see if decomposition products were formed at the somewhat elevated processing temperature employed to extrude the composite materials and (3) completing preliminary GC/MS studies by first collecting gases produced from the materials at 200° C./10 min onto and adsorbent and desorbing them into the chromatography equipment.

The impact of drying the stainless steel bundles under different conditions for 16 h was considered. Microscope images suggest that drying of the stainless steel bundles did assist in reducing the porosity of the samples with all of the dried materials demonstrating a reduced but not eliminated porosity. It remained unclear what the source of the remaining voids were considering that extrusion of virgin Surlyn did provided a porous strand. The residual porosity was linked to some type of decomposition process or more likely but also more difficult to prove the release or air trapped within the tightly packed stainless steel micro-fibres following dispersion into the matrix. This type of effect is known when organically modified clay platelets in agglomerated form are nano-dispersed into polymers and necessitates the use of both atmospheric and vacuum assisted venting to eliminate air.

Gravimetric weight loss from stainless steel fibre bundles heated over various periods of time revealed that after 10 min at 200° C. just 0.02% loss occurred with this value growing to 0.16% at 2 h and 1.3% following 24 h. Even though compounding residence times were generally less than one minute this did point to the fact that some type of decomposition reaction was occurring at the processing conditions.

Gas Chromatography coupled to mass spectroscopy (GC/MS) was employed to analyse the off gases with the results for the sized stainless and Surlyn cover material assessed independently with the elution time results and fragmentation pattern obtained referenced back to the systems in-built library. The preliminary results from that study suggested that little water was produced (this was trapped prior to reaching the column) but a range of decomposition products were noted and preliminary assignments made. Although it is impossible to make an assessment of the relative quantities of each of the decomposition products based on detector response alone (since this scale is automatically maximized relative to the largest peak), it does provide support to the notion that the porosity is at least partially due to decomposition perhaps from the polyester thermoplastic based size employed considering that Surlyn alone does not provide defects when extruded.

The impact of drying stainless steel prior to compounding on the conductivity and mechanical performance of the extruded strands is illustrated in FIG. 28 and the following table, respectively. Conductivity values were generally marginally reduced for both selected grades of Surlyn following the pre-drying process. For example Surlyn 9650 with 20 wt % undried stainless steel provided a conductivity value of 36 S/cm compared with a value of 18 S/cm for the sample incorporating stainless steel dried at 100° C. under vacuum. These values are interesting and suggest that the porosity in the strand may serve to increase conductivity values by reducing the density of the material and hence interaction presumably via at least some direct contact rather than Surlyn bridged interactions between the stainless steel micro fibres.

Mechanical performance results for the same systems completed on the strand itself are provided in the following table. Considering that some specimen geometry variation existed (unlike the injection moulded dog bones) the tensile strength, which accounts for the specimen specific dimensions in the calculation, is the most useful column for comparison. Tensile strength values for undried stainless steel specimens were lower than the virgin matrix, whilst dried samples (preferably at 70° C. under conventional (desiccated) oven conditions) provided up to a 17% improvement in strength.

| Stainless Steel Conditioning | Max Load (N) | Stress @ Yield (MPa) | Max Tensile Stress (MPa) |
| --- | --- | --- | --- |
| Surlyn 9650 (matrix only) | 110 | 16.1 | 16.4 |
| No drying | 105 | 15.5 | 15.5 |
| Oven Dried at 70° C. | 108 | 18.6 | 18.6 |
| Vacuum Oven Dried at 70° C. | 109 | 17.7 | 17.7 |

-continued

| Stainless Steel Conditioning | Max Load (N) | Stress @ Yield (MPa) | Max Tensile Stress (MPa) |
|---|---|---|---|
| Vacuum Oven Dried at 100° C. | 103 | 15.2 | 15.2 |
| Surlyn 9520 (matrix only) | 88 | 16.7 | 16.8 |
| No Drying | 109 | 16.2 | 16.2 |
| Oven Dried at 70° C. | 113 | 19.6 | 19.6 |
| Vacuum Oven Dried at 70° C. | 110 | 18.6 | 18.6 |
| Vacuum Oven Dried at 100° C. | 110 | 17.0 | 17.1 |

In all cases drying at higher temperatures provided reduced performance and it is foreseeable that at 100° C. some decomposition took place or alternatively relaxation of the Surlyn or polyester size complicated processing/dispersion and hence the fibres did not form as good a network structure—partially supported by the conductivity results.

Strand porosity has been linked to issues of moisture, entrapped air and release of decomposition products from the stainless steel micro-fibre bundles during processing. Although a properly configured vent stage should reduce composite strand porosity pre-drying the stainless steel under mild conditions was shown to reduce porosity and improve the mechanical strength of the composite. It appears likely that having some strand porosity is beneficial to composite conductivity values presumably due to it increasing the likelihood of direct electrical connection between the stainless steel micro-fibres rather than that insulated by the Surlyn matrix. However if the drying process is conducted carefully only a slight loss in conductivity was noted with a 17% improvement in the wires mechanical strength resulting.

EXAMPLE 11

Samples of various weight loadings of conductive filler were manufactured into 3 mm diameter strands using single and twin screw extruders with low and high shear screw designs.

Initial electrical conductivity measurements showed a length dependency where longer strand lengths gave more consistent results. This was attributed to dispersion of the conductive filler in shorter strands not being uniform throughout the length of the strand. Short samples could give regions of high or low concentrations which led to variable results, whereas long samples averaged this variation out.

For the use of stainless steel fibres as conductive filler, percolation plots were obtained as shown in FIG. 29.

This initial work also gave a number of interesting results which are summarised below:
  The inclusion of the conductive filler in the polymer caused a reduction in the melt flow index (MFI) but this did not always have a detrimental effect on physical/mechanical properties (break strength, elongation to break or impact strength). This is believed to be due to the relatively low loadings by volume.
  High conductivity fillers did not necessarily give a highly conductive polymer strand. This is attributed to the ability to break up agglomerations, particularly for many of the nano-materials which form strong particle agglomeration, and then disperse the materials evenly through the polymer.
  Single screw extruders produced strands with higher conductivities for the same combination of conductive filler and polymer. It had been thought that higher shear twin screw systems would lead to improved dispersion of the conductive filler in the polymer, but for the systems tested this was found to have either no effect or resulted in damage to the larger particles of conductive filler, particularly conductive fibres.

EXAMPLE 12

In an effort to give extra strength and/or high elongation to break, it was decided to switch the emphasis to Surlyn polymer as this was found to give considerably higher elongation to break even at high SSF loadings when compared with the other polymer materials. This is demonstrated by comparing the results in the following two tables.

Physical Properties of HDPE Samples with Different SSF Loadings

| Loading Wt % (Vol %) | MFI (g/10 min) | Tensile Strength (MPa) | Elongation (%) | Modulus (MPa) | Impact (kJ/m$^2$) |
|---|---|---|---|---|---|
| 0 | 91 | 22 | 86 | 583 | 1.5 |
| 5 (0.47) | 54 | 22 | 28 | 650 | 1.5 |
| 15 (1.4) | 24 | 21 | 22 | 660 | 1.6 |
| 30 (2.8) | — | 20 | 17 | 731 | 2.2 |

Physical Properties of Surlyn Samples with Different SSF Loadings

| Loading Wt % (Vol %) | MFI (g/10 min) | Tensile Strength (MPa) | Elongation (%) | Modulus (MPa) | Impact (kJ/m$^2$) |
|---|---|---|---|---|---|
| 0 | 46 | 17 | 439 | 92 | 58 |
| 5 (0.47) | 28 | 15 | 386 | 102 | 64 |
| 15 (1.4) | 20 | 15 | 354 | 125 | 65 |
| 30 (2.8) | 3 | 15 | 283 | 189 | 56 |

EXAMPLE 13

Figure 30:
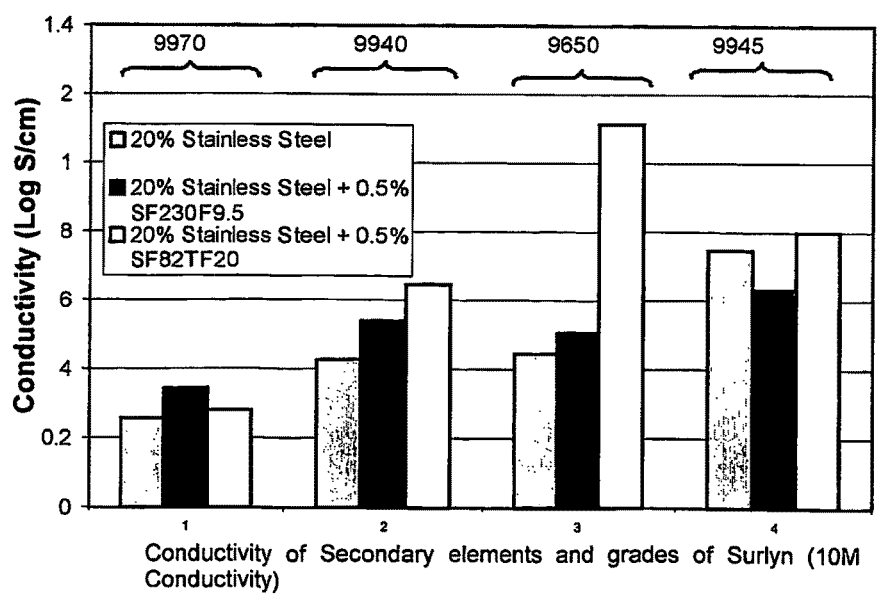

Unlike other polyolefin-based samples Surlyn has a number of variables in the selection of the material, i.e., % acid, % neutralisation and salt(ion) type. It was decided to do a more extensive study of Surlyn to determine what effect these parameters have on conductivity. The results are show in FIG. 30.

Selection of the correct material along with the right processing conditions resulted in samples with the best conductivity, in the order of 50 S/cm consistently and up to 100 S/cm for one sample. The higher neutralisation samples appear to give better results. It is uncertain as to whether this is due to the increased concentration of ionic species in the Surlyn or better adhesion between the Surlyn and fibre matrix ensuring a better pathway along the conductive fibre. This work showed that the level of neutralisation, acid content and salt were important parameters in conductivity of Surlyn based systems.

EXAMPLE 14

To date all work has been done on 3 mm conductive strands. However, whilst useful to prove the concept, a 3 mm strand will be unlikely to form the basis for a commercial product. A 1 mm die was therefore made and samples of Surlyn based strands made.

The results, comparing strand diameters and compositions, are shown in FIG. 31.

EXAMPLE 15

Signal Transmission

A series of crude experiments have been carried out to determine if polymer wires in accordance with the present invention are capable of conducting a signal over an extended length. A 5V, 1.2 kHz signal was run through various polymer wires. A Fluke oscilloscope was used to measure the signal by placing it in line with the circuit on the earth side of the signal. The signal was compared to a piece of copper wire and to a conventional signal tube as a comparison of a pure conductor and pure insulator. The polymer wire was laid out on the vinyl floor of the lab ensuring that no parts of the wire where touching.

Three strands of conductive polymer wire were tested to determine if they were capable of conducting a square wave without loss of signal. The composition of each strand and the traces recorded are shown in FIGS. 34 to 36. The traces for the copper wire and for the insulator are shown in FIGS. 32 and 33, respectively.

As can be seen the traces for the 2 polyethylene based 10 m long samples give wave patterns identical to the original trace. The Surlyn sample shows a loss of waveform and signal. Further investigation would suggest that this is due to the high contact of the uninsulated wire on the floor. This is based on a series of patterns measured on the first metre of the 85 m sample, a 1 m metre sample measured directly and the same sample measured whilst bunched together, see FIGS. 37 to 39. This shows that as the degree of contact of the uninsulated polymer wire with other bodies increases, the square wave pattern deteriorates and the voltage level drops.

The work reported above was done at a fixed value of 1.2 khz at 5V on 3 mm diameter wire. For the polymer wire to be useful item it needs to be capable of transmitting data over a broader range of frequencies and voltages at diameters smaller than 3 mm.

Figure 40:
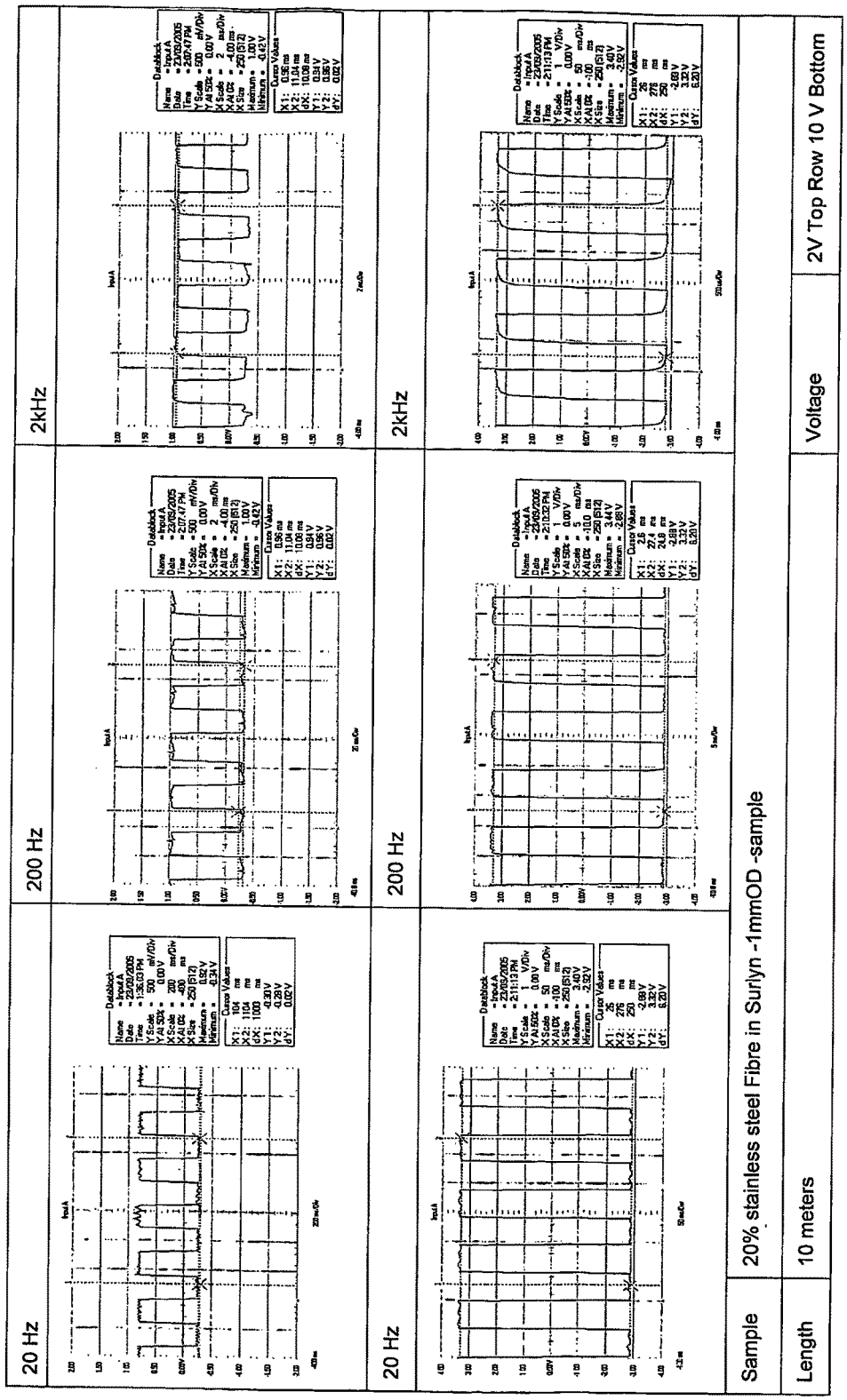

A second set of trials was conducted on the first generation 1 mm diameter wires over 5 decades of frequency (2 Hz to 200 kHz) and at 2 and 10V. A typical set of results is shown in FIG. 40.

As the sample is expected to undergo reasonable extension during the loading process and during possible hole slumping it must also be capable of transmitting the signal over an extension of at least 30% (equivalent to soft copper wire) and preferably 60% (break elongation of signal tube). To test this, samples of polymer wire were placed in insulated bollard grips, 100 mm apart, in the tensile tester. Crocodile clips were connected close to the bollard clamps and a 2 kHz signal applied. The sample was extended a fixed increment at either 20 or 100 m/min and stopped. The load (kg) was read immediately and the waveform recorded. A typical result is shown in FIG. 41 and even at 90% extension very little loss in signal is obtained.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A conductive wire suitable for the transmission of an electrical operating signal to a detonator, which conductive wire comprises an outer sheath provided over a conductive element for transmission of the electrical operating signal, the conductive element being in the form of a wire and comprising a conductive filler that is homogeneously dispersed in a polymer matrix and that is present in a form and concentration so as to provide multiple conducting pathways for transmission of an electrical operating signal through the conductive element, wherein the conductive element has an electrical conductivity of at least $10^0$ S/cm,
wherein the conductive filler comprises conducting fibres having an aspect ratio (length divided by diameter) from about 200 to about 1000.

2. A conductive wire according to claim 1, the conductive filler further comprises conducting particles having average particle size of from 10 to 100 nm.

3. A conductive wire according to claim 2, wherein the conductive filler is selected from carbon black and carbon nanotubes.

4. A conductive wire according to claim 1, wherein the conductive filler further comprises conducting flakes selected from aluminium flakes, copper flakes, silver flakes, nickel flakes, magnesium flakes, chromium flakes, tin flakes, zinc flakes, tantalum flakes and alloy flake of two or more of these metals.

5. A conductive wire according to claim 1, wherein the conducting fibres are selected from aluminium fibres, copper fibres, silver fibres, nickel fibres, magnesium fibres, chromium fibres, tin fibres, zinc fibres, tantalum fibres and alloy fibres of two or more of these metals, and carbon fibres.

6. A conductive wire according to claim 1, wherein the conducting fibres are stainless steel fibres.

7. A conductive wire according to claim 1, wherein the conducting fibres have a maximum length (longest direction) of about 10 mm.

8. A conductive wire according to claim 1, wherein the conducting fibres are metal-coated fibres.

9. A conductive wire according to claim 8, wherein the metal-coated fibres are silver-coated copper fibres.

10. A conductive wire according to claim 1, wherein the conductive filler further comprises conducting particles and/or conducting flakes.

11. A conductive wire according to claim 1, further comprises metal-coated flakes.

12. A conductive filler according to claim 11, wherein the metal-coated flakes are selected from silver-coated glass flakes and silver-coated copper flakes.

13. A conductive wire according to claim 1, wherein the polymer is selected from low and high density polyethylenes, polypropylenes, and cyclic olefins, vinyl polymers and copolymers, acrylonitrile-butadiene-styrene (ABS) copolymers and blends thereof, polycarbonates, nylons, polyesters, polyarylene ether sulfones and ketones, polyphenylene ethers, polyamide imides, polyetherimides and polystyrenes, and ethylene-methacrylic acid copolymers in which part of the methacrylic acid is neutralized with a metal ion.

14. A conductive wire according to claim 1, wherein the amount of conductive filler included in the polymer matrix is less than 50 wt % based on the total weight of the polymer and conductive filler.

15. A conductive wire according to claim 14, wherein the amount of conductive filler is from 10 to 20% by weight based on the total weight of the polymer and conductive filler.

16. A conductive wire according to claim 1, which has an electrical conductivity of from $10^0$ to $10^2$ S/cm.

17. A conductive wire according to claim 1, which has an elongation to break of at least 30%.

18. A method of making a conductive wire as claimed in claim 1 which method comprises homogeneously dispersing a conductive filler in an extrudable polymer matrix to form a blend, and followed by extruding the blend to form a wire, wherein the conductive filler is present in the blend in a form and concentration, and the blend is extruded in a manner, such that in the extruded conductive element the conductive filler provides multiple conducting pathways that enable transmission of an electrical operating signal through the extruded conductive element, wherein the conductive element has an electrical conductivity of at least $10^0$ S/cm, and wherein the conductive filler comprises conducting fibres having an aspect ratio (length divided by diameter) from about 200 to about 1000.

19. A method of operating a blasting system comprising an electric or electronic detonator which comprises transmitting an electrical operating signal to the electric or electronic detonator through a conductive wire as claimed in claim 1.

20. A blasting system comprising control equipment and a detonator, wherein the control equipment is in electrical signal communication with the detonator by a conductive wire as claimed in claim 1.

* * * * *

UNITED STATES PATENT AND TRADEMARK OFFICE
CERTIFICATE OF CORRECTION

PATENT NO. : 8,502,077 B2
APPLICATION NO. : 12/307918
DATED : August 6, 2013
INVENTOR(S) : David Brian Kay et al.

Page 1 of 1

It is certified that error appears in the above-identified patent and that said Letters Patent is hereby corrected as shown below:

ON THE TITLE PAGE:

At item (73), correct the identity of the Assignees to read as follows:

--(73) Assignees: Orica Explosives Technology Pty Ltd, Melbourne (AU);
Commonwealth Scientific and Industrial Research Organisation, Campbell (AU)--.

Please insert the following:

--(30) Foreign Application Priority Data

Jul. 13, 2006 (AU) .................. 2006903773--.

Signed and Sealed this
Tenth Day of December, 2013

Margaret A. Focarino
*Commissioner for Patents of the United States Patent and Trademark Office*